(12) United States Patent
Brun et al.

(10) Patent No.: US 12,441,040 B2
(45) Date of Patent: Oct. 14, 2025

(54) BUBBLE CASTING SOFT ROBOTICS

(71) Applicant: The Trustees of Princeton University, Princeton, NJ (US)

(72) Inventors: Pierre-Thomas Brun, Princeton, NJ (US); Trevor J. Jones, Princeton, NJ (US); Etienne Jambon-Puillet, Paris (FR); Joel Marthelot, Marseilles (FR)

(73) Assignee: The Trustees of Princeton University, Princeton, NJ (US)

( * ) Notice: Subject to any disclaimer, the term of this patent is extended or adjusted under 35 U.S.C. 154(b) by 267 days.

(21) Appl. No.: 18/212,937

(22) Filed: Jun. 22, 2023

(65) Prior Publication Data

US 2023/0415390 A1 Dec. 28, 2023

Related U.S. Application Data

(60) Provisional application No. 63/354,538, filed on Jun. 22, 2022.

(51) Int. Cl.
*B29C 45/17* (2006.01)
*F15B 15/08* (2006.01)
(Continued)

(52) U.S. Cl.
CPC .......... *B29C 45/1704* (2013.01); *F15B 15/08* (2013.01); *B29C 2045/1719* (2013.01);
(Continued)

(58) Field of Classification Search
CPC ......... B29C 45/1704–1711; B29C 2045/1719; B29C 2045/1712–1731
See application file for complete search history.

(56) References Cited

U.S. PATENT DOCUMENTS 5,262,105 A * 11/1993 Komiyama ....... B29C 45/14336
264/572
6,106,761 A * 8/2000 Sjoberg ................. B29B 15/122
522/28
(Continued)

OTHER PUBLICATIONS

Wehner, Michael, et al. "An integrated design and fabrication strategy for entirely soft, autonomous robots." nature 536.7617 (Aug. 24, 2016): 451-455. (Year: 2016).*
(Continued)

*Primary Examiner* — Benjamin A Schiffman
(74) *Attorney, Agent, or Firm* — Meagher Emanuel Laks Goldberg & Liao, LLP

(57) ABSTRACT

Disclosed herein is an all-in-one methodology for the fabrication and the programming of soft machines. Instead of relying on the assembly of individual parts, the disclosed approach harnesses interfacial flows in elastomers that progressively cure to robustly produce monolithic pneumatic actuators whose shape can easily be tailored to suit applications ranging from artificial muscles to grippers. Rationalized herein are the fluid mechanics at play in the assembly of the disclosed actuators and modeled herein are their subsequent morphing. This quantitative knowledge was leveraged to program these soft machines and produce complex functionalities, for example sequential motion obtained from a monotonic stimulus. It is expected that the flexibility, robustness, and predictive nature of the disclosed methodology will accelerate the proliferation of soft robotics by enabling the assembly of complex actuators, for example long, tortuous, or vascular structures, thereby paving the way towards new functionalities stemming from geometric and material nonlinearities.

14 Claims, 22 Drawing Sheets

(51) Int. Cl.
    *B29K 83/00*           (2006.01)
    *B29L 31/00*           (2006.01)

(52) U.S. Cl.
    CPC .. *B29C 2045/1724* (2013.01); *B29K 2083/00* (2013.01); *B29L 2031/748* (2013.01)

(56) References Cited

U.S. PATENT DOCUMENTS

| | | | |
|---|---|---|---|
| 6,666,999 B1* | 12/2003 | Orsen | B29C 45/1704 264/572 |
| 6,787,097 B1* | 9/2004 | Homann | B29C 45/1704 264/572 |
| 2001/0050450 A1* | 12/2001 | Kayano | B29C 45/1639 264/572 |
| 2010/0102490 A1* | 4/2010 | Smith | A61M 5/158 264/537 |
| 2010/0276133 A1* | 11/2010 | Ojiro | F28D 1/0477 165/181 |
| 2011/0210482 A1* | 9/2011 | Sakamoto | F28F 1/16 165/185 |
| 2011/0254203 A1* | 10/2011 | Eckardt | B29C 45/1704 264/328.14 |
| 2012/0068388 A1* | 3/2012 | Sakamoto | B29C 45/1704 264/573 |
| 2013/0236591 A1* | 9/2013 | Sakamoto | B29C 45/0055 425/577 |
| 2014/0183774 A1* | 7/2014 | Ezure | B29C 43/02 264/50 |
| 2016/0200027 A1* | 7/2016 | Tachiiwa | B29C 49/06 264/537 |
| 2017/0106575 A1* | 4/2017 | Iwata | B29C 45/1704 |
| 2018/0186049 A1* | 7/2018 | Wolfsberger | B29C 45/1706 |
| 2021/0060836 A1* | 3/2021 | Noda | B29C 45/1734 |

OTHER PUBLICATIONS

Faller, Lisa-Marie, et al. "An all-flexible sensing sole for legged robots." Aug. 8, 2019 IEEE international conference on flexible and printable sensors and systems (FLEPS). IEEE, 2019. (Year: 2019).*
Jones, Trevor J., et al. "Bubble casting soft robotics." Nature 599.7884 (Nov. 10, 2021): 229-233. (Year: 2021).*
Jones, Trevor, Etienne Jambon-Puillet, and Pierre-Thomas Brun. "Design and mechanics of complex inflatable networks." Bulletin of the American Physical Society 65 (Mar. 2, 2020). (Year: 2020).*
Zhao, Tingting, et al. "Superstretchable and processable silicone elastomers by digital light processing 3D printing." ACS applied materials & interfaces 11.15 (Mar. 26, 2019): 14391-14398. (Year: 2019).*
Jones, Trevor, Etienne Jambon-Puillet, and Pierre-Thomas Brun. p. 4, 9:24AM A30.00006: "Design and mechanics of complex inflatable networks." Bulletin of the American Physical Society 65 (Mar. 2, 2020). (Year: 2020).*
Polygerinos, Panagiotis et al., "Soft robotic glove for combined assistance and at-home rehabilitation," Robotics and Autonomous Systems, vol. 73, pp. 135-143, 2015.
Zhao, Huichan et al., "Scalable manufacturing of high force wearable soft actuators," Extreme Mechanics Letters, vol. 3, pp. 89-104, 2015.
Aussillous, Pascale and Quere, David, "Quick deposition of a fluid on the wall of a tube," Physics of Fluids, vol. 12, pp. 2367-2371, Oct. 1, 2000.
Klaseboer, Evert et al., "An extended Bretherton model for long Taylor bubbles at moderate capillary numbers," Physics of Fluids, vol. 26, p. 032107, Mar. 20, 2014.
Polygerinos, Panagiotis et al., "Soft Robotics: Review of Fluid-Driven Intrinsically Soft Devices; Manufacturing, Sensing, Control, and Applications in Human-Robot Interaction," Advanced Engineering Materials, vol. 19, No. 12, p. 1700016, 2017.

Mosadegh, Bobak et al., "Pneumatic Networks for Soft Robotics that Actuate Rapidly," Advanced Functional Materials, vol. 24, pp. 2163-2170, 2014.
Yang, Dian et al., "Buckling Pneumatic Linear Actuators Inspired by Muscle," Advanced Materials Technologies, vol. 1, p. 1600055, 2016.
Martinez, Ramses V. et al., "Robotic Tentacles with Three-Dimensional Mobility Based on Flexible Elastomers," Advanced Materials, vol. 25, pp. 205-212, 2013.
Roche, Ellen T. et al., "A Bioinspired Soft Actuated Material," Advanced Materials, vol. 26, pp. 1200-1206, 2014.
Gorissen, Benjamin et al., "Elastic Inflatable Actuators for Soft Robotic Applications," Advanced Materials, vol. 29, p. 1604977, 2017.
Jin, Lishuai et al., "Kirigami-Inspired Inflatables with Programmable Shapes," Advanced Materials, vol. 32, p. 2001863, 2020.
Whitesides, George M., "Soft Robotics," Angewandte Chemie International Edition, vol. 57, pp. 4258-4273, 2018.
Ilievski, Filip et al., "Soft Robotics for Chemists," Angewandte Chemie International Edition, vol. 123, pp. 1930-1935, 2011.
Overvelde, Johannes T. B. et al., "Amplifying the response of soft actuators by harnessing snap-through instabilities," PNAS, vol. 112, No. 35, pp. 10863-10868, Sep. 1, 2015.
Boley, J. William et al., "Shape-shifting structured lattices via multimaterial 4D printing," PNAS, vol. 116, No. 42, pp. 20856-20862, Oct. 15, 2019.
Takagi, Daisuke and Huppert, Herbert E., "Flow and instability of thin films on a cylinder and sphere," Journal of Fluid Mechanics, vol. 647, pp. 221-238, 2010.
Yang, Hee Doo et al., "Modeling and Analysis of a High-Displacement Pneumatic Artificial Muscle With Integrated Sensing," Frontiers in Robotics and AI, vol. 5, Art. 136, Jan. 7, 2019.
Jambon-Puillet, Etienne et al., "Elastic amplification of the Rayleigh-Taylor instability in solidifying melts," PNAS, vol. 118, No. 10, p. e2020701118, Feb. 22, 2021.
Kaufman, Joshua J. et al., "Structured spheres generated by an in-fibre fluid instability," Nature, vol. 487, pp. 460, 463-467, Jul. 26, 2012.
Hu, Wenqi et al., "Small-scale soft-bodied robot with multimodal locomotion," Nature, vol. 554, pp. 81-85, Feb. 1, 2018.
Lee, A. et al., "Fabrication of slender elastic shells by the coating of curved surfaces," Nature Communications, vol. 7, p. 11155, Apr. 4, 2016.
Gladman, A. Sydney et al., "Biomimetic 4D printing, " Nature Materials, vol. 15, pp. 413-419, Apr. 2016.
Miller, J.T. et al., "Shapes of a Suspended Curly Hair," Physical Review Letters, vol. 112, p. 068103, 2014.
Marthelot, J. et al., "Designing soft materials with interfacial instabilities in liquid films," Nature Communications, vol. 9, p. 4477, 2018.
Guseinov, Ruslan et al., "Programming temporal morphing of self-actuated shells," Nature Communications, vol. 11, No. 237, 2020.
Siefert, Emmanuel et al., "Bio-inspired pneumatic shape-morphing elastomers," Nature Materials, vol. 18, pp. 24-28, Jan. 2019.
Kim, Yoonho et al., "Printing ferromagnetic domains for untethered fast-transforming soft materials," Nature, vol. 558, pp. 274-291, Jun. 14, 2018.
Zhao, Chuangqi et al., "Layered nanocomposites by shear-flow-induced alignment of nanosheets," Nature, vol. 580, pp. 210-226, Apr. 9, 2020.
Cybulski, Olgierd et al., "Concentric liquid reactors for chemical synthesis and separation," Nature, vol. 586, pp. 57-64, Oct. 1, 2020.
Nerger, Bryan A. et al., "Marangoni flows drive the alignment of fibrillar cell-laden hydrogels," Science Advances, vol. 6, p. eaaz7748, Jun. 12, 2020.
Gerbode, Sharon J. et al., "How the Cucumber Tendril Coils and Overwinds," Science, vol. 337, pp. 1087-1091, Aug. 31, 2012.
Acome, E. et al., "Hydraulically amplified self-healing electrostatic actuators with muscle-like performance," Science, vol. 359, pp. 61-65, Jan. 5, 2018.
Kanik, Mehmet et al., "Strain-programmable fiber-based artificial muscle," Science, vol. 365, pp. 145-150, Jul. 12, 2019.

(56) References Cited

OTHER PUBLICATIONS

Hawkes, Elliot W. et al., "A soft robot that navigates its environment through growth," Science Robotics, vol. 2, p. eaan3028, Jul. 19, 2017.
Shepherd, Robert F. et al., "Multigait soft robot," PNAS, vol. 108, No. 51, pp. 20400-20403, Dec. 20, 2011.
Majidi, Carmel, "Soft Robotics: A Perspective—Current Trends and Prospects for the Future," Soft Robotics, vol. 1, No. 1, pp. 5-11, 2014.
Marchese, Andrew D. et al., "Autonomous Soft Robotic Fish Capable of Escape Maneuvers Using Fluidic Elastomer Actuators," Soft Robotics, vol. 1, No. 1, pp. 75-87, 2014.
Yap, Hong Kai et al., "High-Force Soft Printable Pneumatics for Soft Robotic Applications," Soft Robotics, vol. 3, No. 3, pp. 144-158, 2016.
Vasios, Nikolaos et al., "Harnessing Viscous Flow to Simplify the Actuation of Fluidic Soft Robots," Soft Robotics, vol. 7, No. 1, pp. 1-9, 2020.
Paek, Jungwook et al., "Microrobotic tentacles with spiral bending capability based on shape-engineered elastomeric microtubes," Scientific Reports, vol. 5, p. 10768, Jun. 11, 2015.
Bretherton, F.P., "The motion of long bubbles in tubes," Journal of Fluid Mechanics, vol. 10, pp. 166-188, 1961.

\* cited by examiner

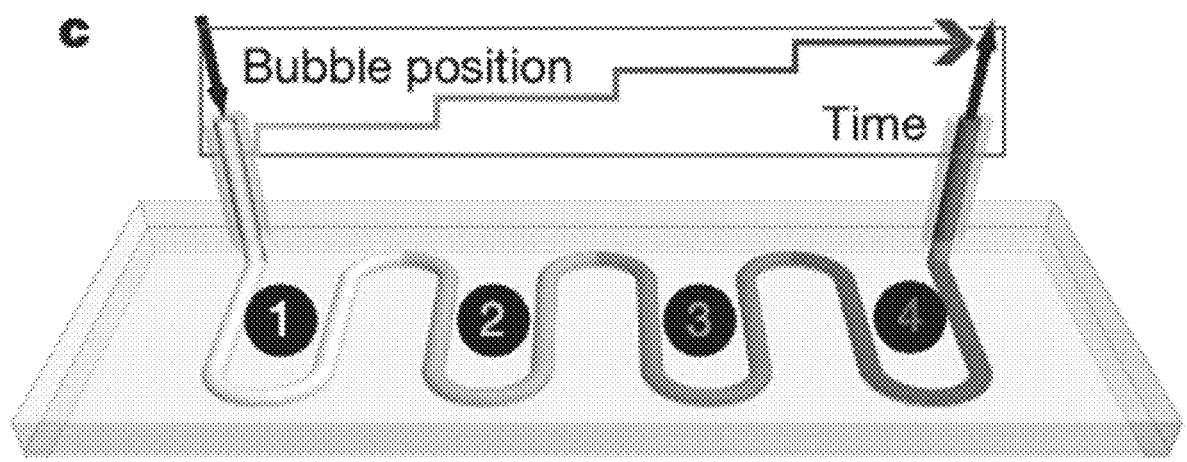
FIG. 4A
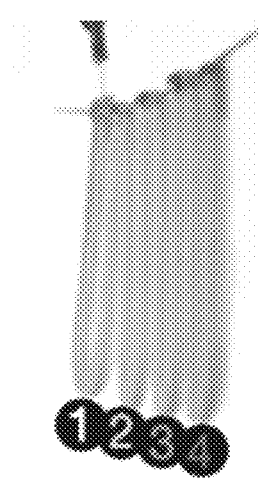 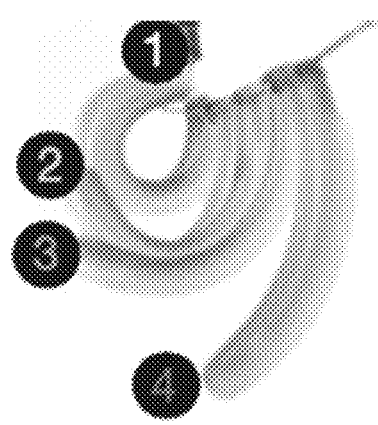 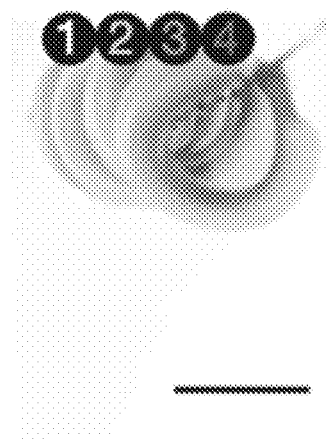
FIG. 4B  FIG. 4C  FIG. 4D

FIG. 21A  FIG. 21B

BUBBLE CASTING SOFT ROBOTICS

CROSS-REFERENCE TO RELATED APPLICATIONS

The present application claims priority to U.S. Provisional Patent App. No. 63/354,538, filed Jun. 22, 2022, the contents of which are incorporated by reference herein in its entirety.

STATEMENT REGARDING FEDERALLY SPONSORED RESEARCH OR DEVELOPMENT

This invention was made with government support under Grant Nos. DMR-1420541 and CBET 2042930 awarded by the National Science Foundation. The government has certain rights in the invention.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Inspired by living organisms, soft robots are developed from intrinsically compliant materials, enabling continuous motions that mimic animal and vegetal movement. In soft robots, the canonical hinges and bolts are replaced by elastomers assembled into actuators programmed to change shape following the application of stimuli, for example pneumatic inflation. The morphing information is typically directly embedded within the shape of these actuators, whose assembly is facilitated by recent advances in rapid prototyping techniques. Yet, these manufacturing processes have limitations in scalability, design flexibility and robustness.

BRIEF SUMMARY

Various deficiencies in the prior art are addressed below by the disclosed compositions of matter and techniques.

In various aspects, a method for assembly and programming of soft robots may be provided. In some embodiments, the method may be a batch process. In some embodiments, the method may be a continuous process. The method may include generating a flooded channel by injecting a liquid undergoing solidification (which may be, e.g., an elastomer) into a channel or a channel network of a mold defining the channel or channel network, where the channel network may include a plurality of channels.

The method may include injecting a bubble into the flooded channel prior to solidification to create a cavity. The method may include forming a target component (e.g., such as an actuator) by allowing a portion of the liquid in an annulus deposited on the mold after bubble injection to drain downward and curing the liquid undergoing solidification. Curing may include, e.g., heating or UV curing the liquid.

The method may include removing the target component from the mold. The method may include creating and/or providing the mold.

The liquid undergoing solidification may include a siloxane, such as, e.g., a vinyl polysiloxane. The method may include tuning a void fraction of the target component by controlling a velocity of the bubble. The method may include rotating portions of the mold relative to each other around the gelation point of the liquid undergoing solidification. The method may include inflating the target component. The pressure used for inflation will depend on the type of liquid undergoing solidification. In some embodiments, the pressure used to inflate the target component may be 5 kPa-1000 kPa. In some embodiments, the pressure used to inflate the target component is greater than 30 kPa. The method may include configuring the target component to generate a curling motion as pressure is applied.

BRIEF DESCRIPTION OF FIGURES

The accompanying drawings, which are incorporated in and constitute a part of this specification, illustrate embodiments of the present invention and, together with a general description of the invention given above, and the detailed description of the embodiments given below, serve to explain the principles of the present invention.

FIGS. 4A-4D are illustrations showing the bubble casting dynamics used to program the deformation of an actuator, that is, displaying sequential flexion of the four labelled digits following inflation via a simple pressure ramp (scale bar, 1 cm). FIG. 4A illustrates the method used to form the component, while FIGS. 4B-4D show the activation of the component.

FIGS. 21A and 21B are a series of images (21A) and calculated elastic curves (21B) for a bubble cast actuator inflated with one end clamped and the other end blocked by a wall (scale bar, 1 cm).

Figure 1:
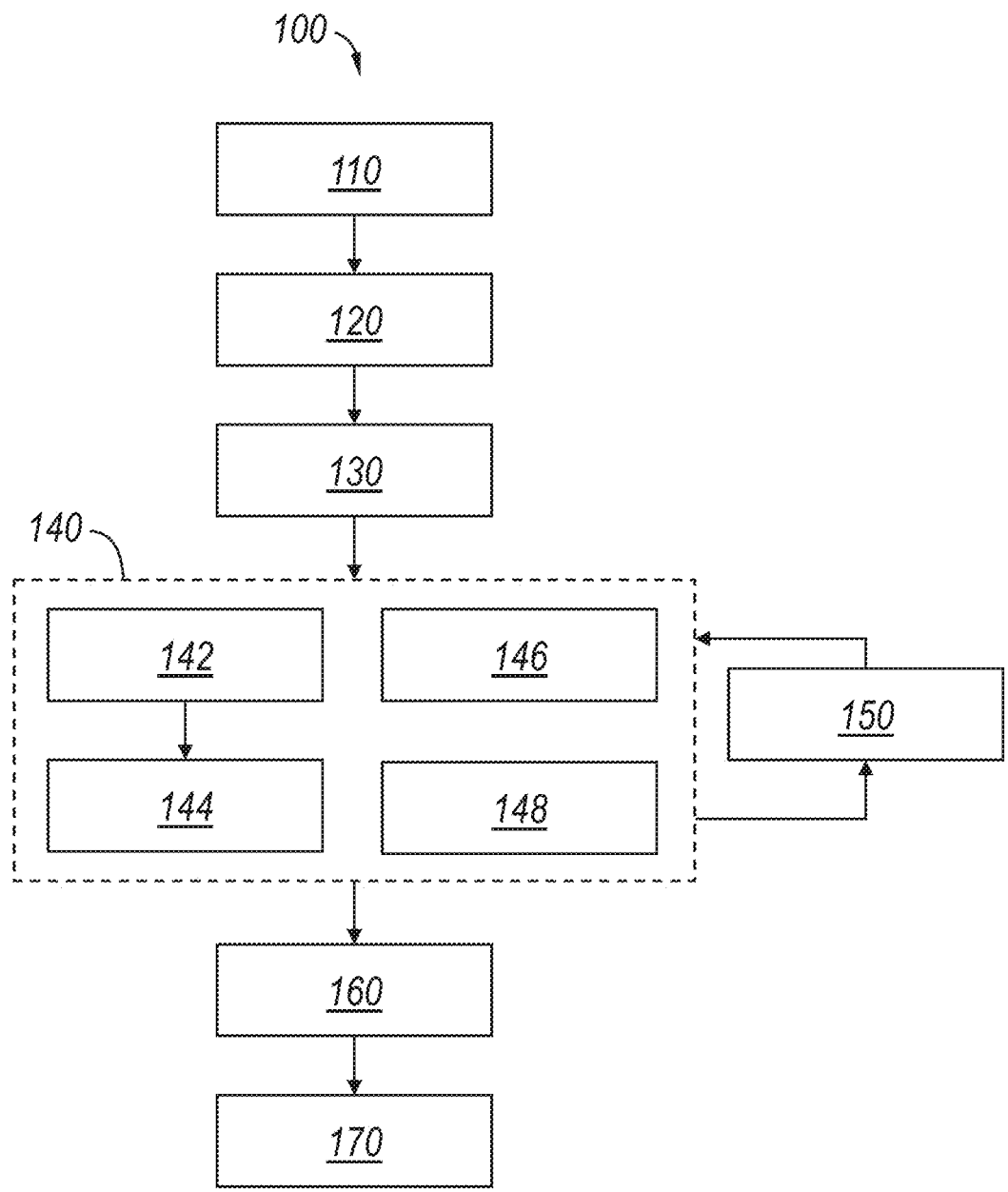
FIG. 1 is flowchart of a method.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or," as used herein, refers to anon-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Disclosed herein is an all-in-one methodology for the fabrication and the programming of soft machines. Instead of relying on the assembly of individual parts, the disclosed approach harnesses interfacial flows in elastomers that progressively cure to robustly produce monolithic pneumatic actuators whose shape can easily be tailored to suit applications ranging from artificial muscles to grippers. Rationalized herein are the fluid mechanics at play in the assembly of the disclosed actuators and modeled herein are their subsequent morphing. This quantitative knowledge was leveraged to program these soft machines and produce complex functionalities, for example sequential motion obtained from a monotonic stimulus. It is expected that the flexibility, robustness and predictive nature of the disclosed methodology will accelerate the proliferation of soft robotics by enabling the assembly of complex actuators, for example long, tortuous or vascular structures, thereby paving the way towards new functionalities stemming from geometric and material nonlinearities.

The disclosed approach utilizes interfacial flows to fabricate soft actuators with mathematical precision. Thus, the limit of manufacturing depends on continuum mechanics more so than manufacturing equipment, e.g., molds. The process is a less invasive manufacturing process that is more robust than existing methodologies; and creates a monolithic actuator that can be programmed for sequential motion using a single pressure source.

In various aspects, a method for assembly and programming of soft robots may be provided. Referring to FIG. 1, the method 100 may include creating 110 and/or providing a mold. The mold may include one or more discrete channels. The mold may include a channel network comprising a plurality of interconnected channels. Such molds are well-known in the art, and it is well-understood how to create a mold for a desired part shape.

The method may include generating 120 a flooded channel by injecting a liquid (such as a liquid already undergoing solidification) into a channel or a channel network of a mold. The liquid may be any appropriate material capable of reversable deformation, and is preferably a cross-linkable polymer such as a siloxane. In some embodiments, the siloxane may be, e.g., a vinyl polysiloxane.

The method may include injecting 130 a bubble into the flooded channel prior to solidification to create a cavity. The bubble may be formed from any appropriate fluid, such as a gas. The gas may be, e.g., air, $CO_2$, $N_2$, etc.

The method may include forming 140 a target component. This may include allowing 142 a portion of the liquid in an annulus deposited on the mold after bubble injection to drain downward and curing 144 the liquid. Curing may include, e.g., heating or UV curing the liquid.

The method may include configuring 146 the target component to generate a curling motion as pressure is applied. The method may include rotating 148 portions of the mold relative to each other around the gelation point of the liquid undergoing solidification. As used herein, the term "gelation point" refers to the state where a liquid material capable of gelation, such as a cross-linkable polymeric material in a composition, changes from a fluid liquid phase to a solid, phase (gel).

The target component may be any appropriate shape or function. For example, in some embodiments, the target components may be a cylindrical actuator.

In some embodiments, a target component may be formed while under centrifugal acceleration. As known in the art, bubbles in a fluid are affected by centrifugal forces. Here, for example, by rotating the mold (or a part of the mold) around an axis while the bubble is passing through the channel and the liquid is solidifying, the positioning and cross-sectional shape of the bubble relative to the channel it is passing through will change. This ability to further control the void formed in the target component can allow for complex components to be formed.

The method may include tuning 150 a void fraction of the target component by controlling a velocity of the bubble through the channel.

Once the bubble has advanced as desired, and the appropriate void(s) have been created, the method may include removing 160 the target component from the mold. This may be done in any appropriate manner known to those of skill in the art.

The method may include inflating 170 the target component. The pressure used for inflation will depend on the properties of the liquid undergoing solidification. This can be understood with respect to equation 3, below. In some embodiments, the pressure used to inflate the target component may be 5 kPa-1000 kPa. In some embodiments, the pressure used to inflate the target component is greater than 30 kPa.

In some embodiments, the method may be a batch process. In some embodiments, the method may be a continuous process. For example, for relatively long target component, a continuous process may be advantageous.

Examples

Many actuators have been made where the shape was measured and compared to theory. The bending response was measured when a straight actuator is inflated at various pressures. For example, actuators were made that grip items such as blackberries and tomatoes. Actuators were also made that lift objects using a contractile coiling motion. In addition, actuators were made that shape-morph from 2D planar curves to 3D geodesic curves.

Figure 2:
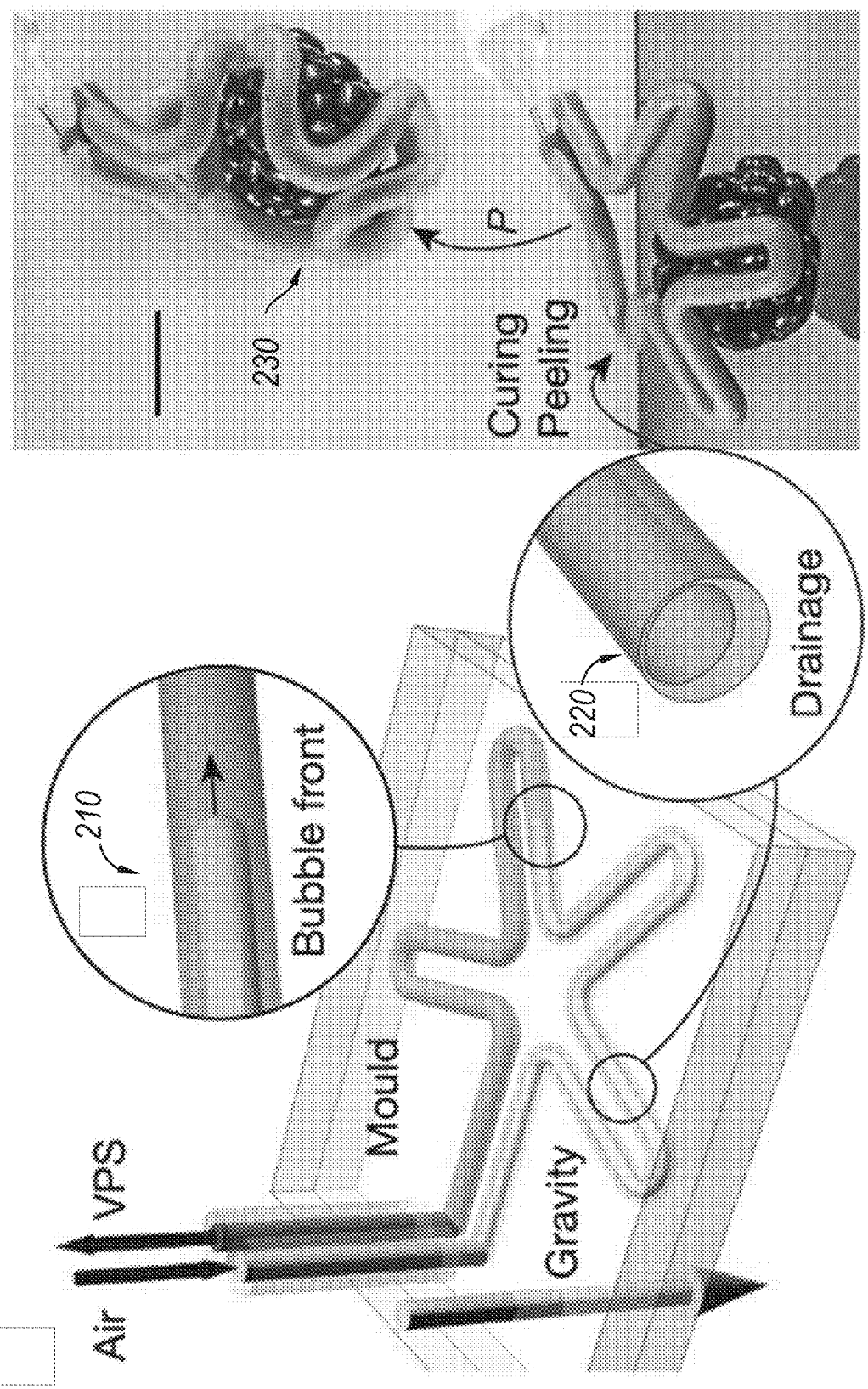
FIG. 2 is a schematic of a bubble casting fabrication methodology: (i) a bubble is injected in a mold previously flooded with polymer melt, (ii) the residue of polymer drains and cures to provide an anisotropic actuator that (iii) can be readily used when de-molded, for example as a gripper (scale bar, 1 cm).

Referring to FIG. 2, a tubular mold was first filled by injecting uncured elastomer melt.

Vinyl polysiloxane (VPS), Zhermack elite double 8, 16 and 32 silicone elastomers were used. Curing was initiated by mixing the prepolymer base and curing catalyst in a 1:1 weight ratio in a centrifugal mixer (Thinky) for 10 s at 2,000 rpm (clockwise) and 10 s at 2,200 rpm (anticlockwise). After mixing, at t=0, the polymer melt gradually solidifies and transitions from a viscous liquid to an elastic solid. All elastomers were stored and prepared at room temperature in ambient conditions.

While the melt was still liquid, air was injected to form an elongated bubble 210 that creates the inner void of the actuator. Gravity then sculpted the actuator by draining the polymer film and allowing the bubble to rise (see drainage 220). Eventually, as the melt solidifies this shape is 'frozen' and the actuator can be readily used when de-molded, for example, as a gripper 230.

In the following, it is demonstrated how to control bubble casting to achieve versatile and programmable components. Schematics for various types of experiments are shown in FIGS. 19A-19D.

The bubble velocity, curvature data and free-hang length was recorded using a camera and computed using image processing done in Python. For the molds, cellulose tubes (R=1.6, 2.4, 3.2, 6.4 mm), glass tubes (R=0.5 mm), and cast acrylic sheets carved with a computer numerical control (CNC) milling tool on one side were used. Since the final drainage loses memory of the initial condition (see equation (2)), for these examples, the bubble was often injected early and $T_s$ was reset by flipping the mold. This allowed the ability to maintain constant drainage timing along the length of long actuators. To attach the thin membranes shown in FIGS. 6A-6D, the two sides of the carved molds (see FIG. 2) were separated. Some more polymer was then spin-coated on top of the actuator still encased in the mold. The experiment shown in FIG. 8 by joining two tubes using a 3D printed tube connector. When the polymer is at the gelation point one tube is carefully rotated relative to the other. The cross-section profiles were obtained post-curing using an optical microscope and ImageJ. Pressure data were measured using a differential pressure sensor (MPX5100dp) connected to a data acquisition board (Arduino). To measure the pulling force, the actuator was attached to an INSTRON® 5944 tensile tester, and tensile tests were performed. The blocking force was measured by placing the free end of the actuator on a plate fitted to a load cell. The curvature of our actuators was measured without external forces (for example, gravity) by floating the elastomer on a water bath. The resulting curvature was recorded and measured by fitting a circle to the actuator shape. Actuator mechanics were measured quasi-statically by slowly injecting air in 1 s pulses and waiting 4 s between pulses. All actuators were pierced with syringe needles and inflated by a syringe mounted on a syringe pump (PHD ULTRA™ Dual Syringe Pump 70-3007 from Harvard Apparatus). All experiments were conducted at room temperature in ambient conditions.

Figure 3A:
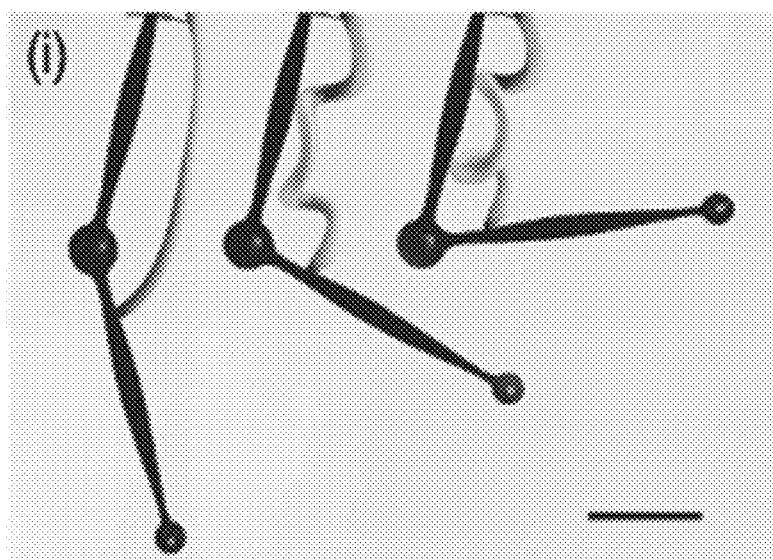
FIGS. 3A and 3B are illustrations showing contractile coiling of long actuators yielding muscle-like contraction (3A) and linear translation (3B) (scale bars, 5 cm).
Figure 3B:
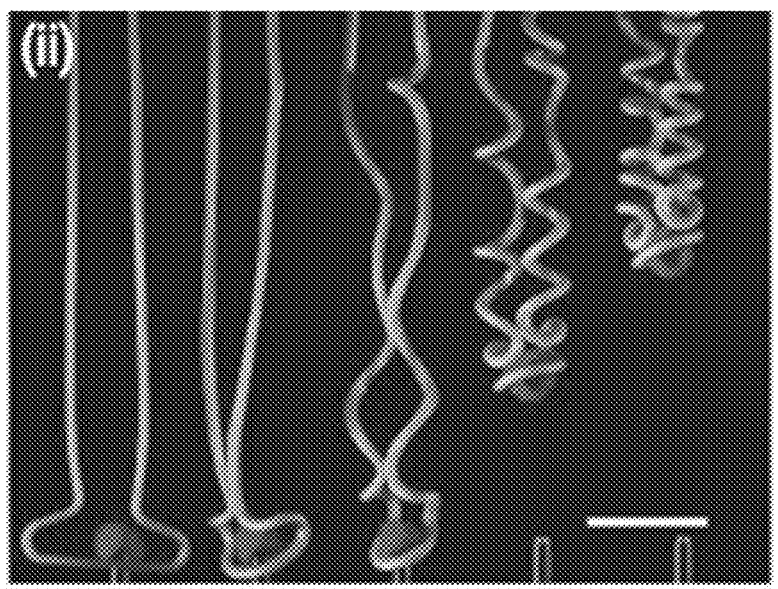

To perform these experiments, one can first fully rationalizes the fluid mechanics at play during the bubble injection and the drainage to predict the shape of the component's cross-section. One then turns to the elastic problem to elucidate how the bending motion upon inflation is determined by the shape previously sculpted. One can leverage these quantitative results to design actuators programmed for specific tasks through bubble casting such as soft robotic muscles with tunable strength capable of lifting objects (see FIGS. 3A-3B) and soft fingers with sequential actuation from a single pressure source (see FIGS. 4A-4D).

Figure 5:
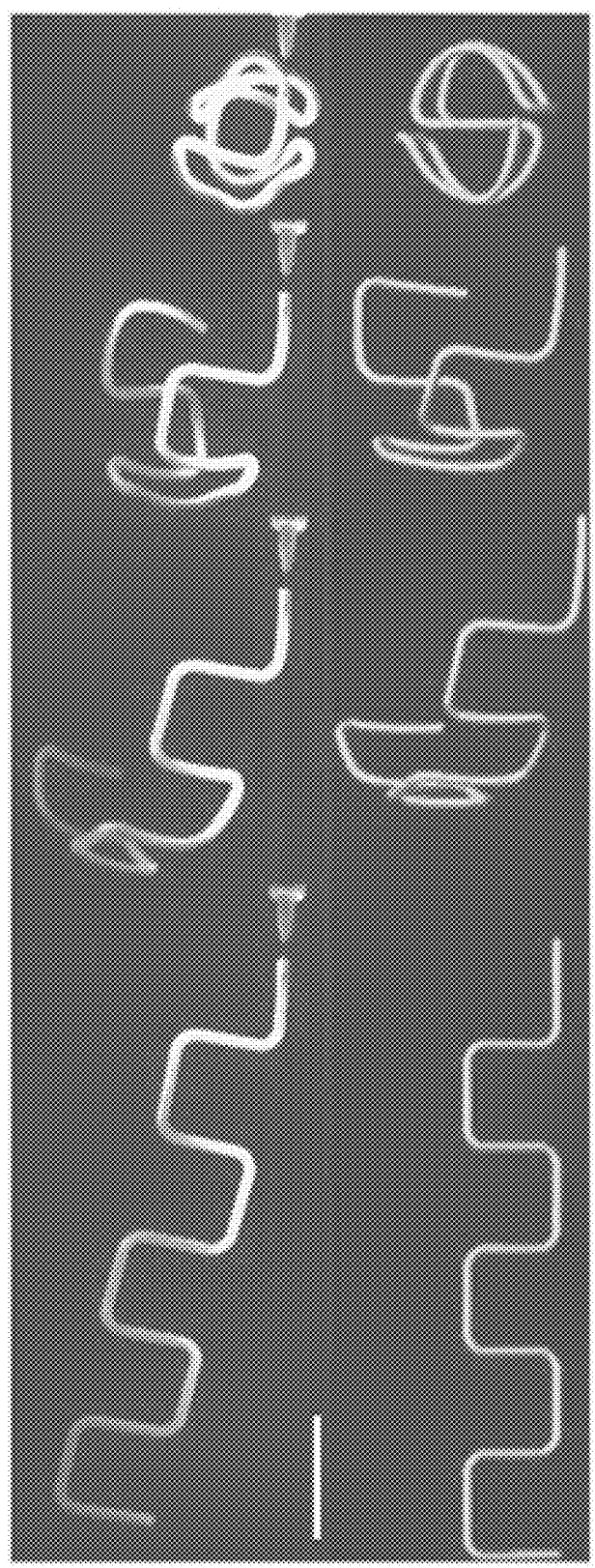
FIG. 5 is an illustration showing morphing dynamics of a curvilinear actuator (experiments and numerical simulation) submerged in a density matched fluid (scale bar, 2 cm).
Figure 6A:
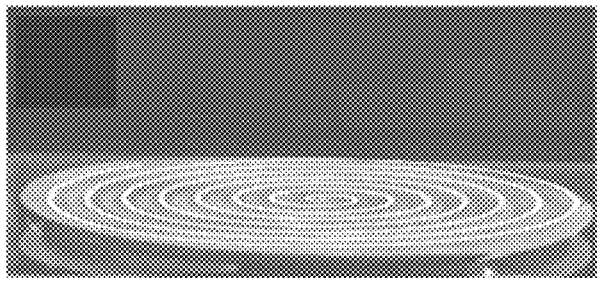
FIGS. 6A-6B are images showing a spiral shaped actuator attached to a thin membrane, in a flat, non-inflated configuration (6A) and a curled, inflated configuration (6B) (scale bar, 2 cm).
Figure 6B:
Figure 6C:
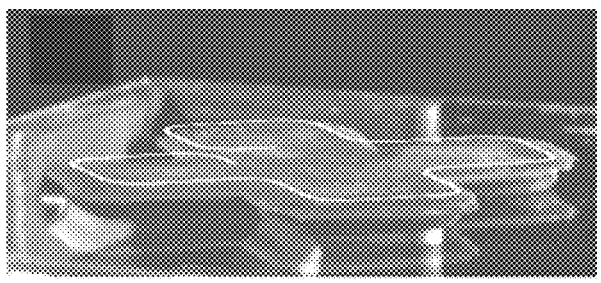
FIGS. 6C-6D are images showing a cross-like actuator attached to a thin membrane, in a flat, non-inflated configuration (6C) and a curled, inflated configuration (6D) (scale bar, 2 cm).
Figure 6D:
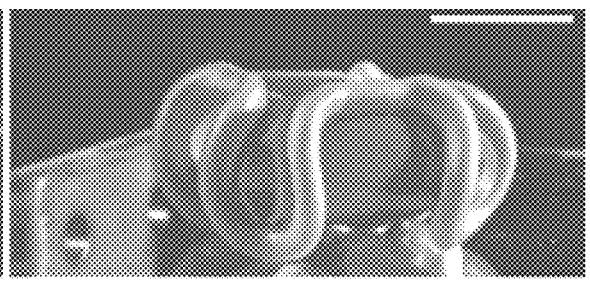
Figure 7:
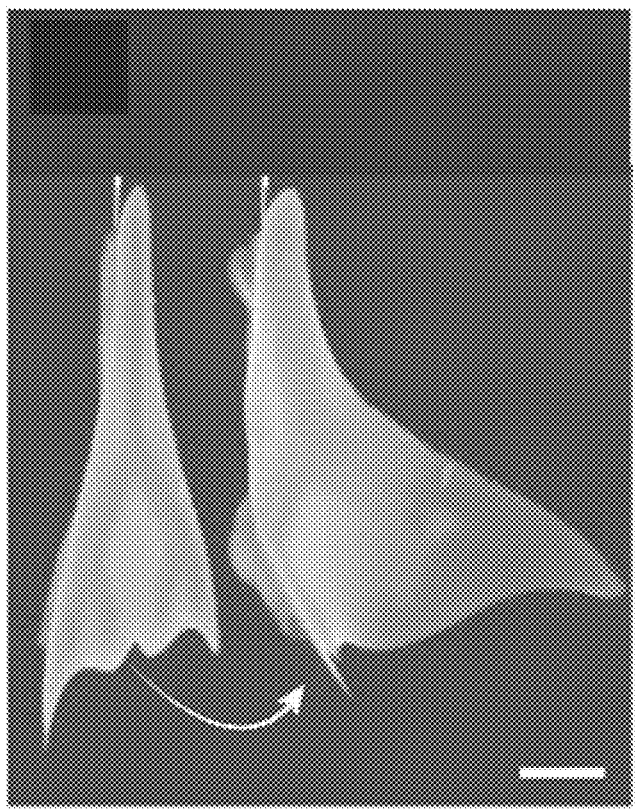
FIG. 7 is an illustration showing a 'fish tail' motion is obtained using bubble-casting in a branched network (scale bar, 1 cm).
Figure 8:
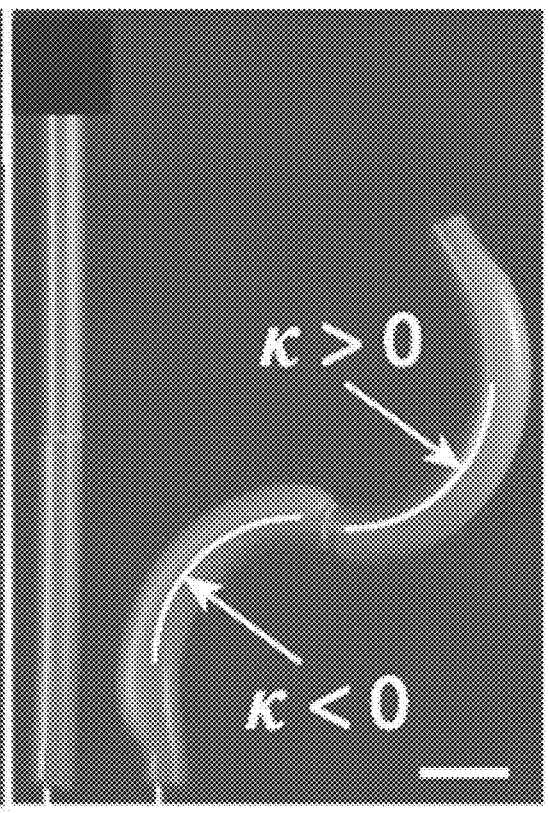
FIG. 8 is an illustration of an actuator displaying curvature of equal magnitude but opposite signs obtained by rotating the mold at the gelation point of the polymer (scale bar, 1 cm).

Additionally, controlled folding in three dimensions can be demonstrated using curvilinear actuators, either free (FIG. 5) or attached to thin membranes (FIGS. 6A-6D, FIG. 7). Finally, it is shown that bending in different directions can be achieved by rotating portions of the mold relative to each other around the gelation point of the polymer (FIG. 8)

The shape of the cross-section of the target components actuators may be imparted by a two-fold process (see FIG. 2). First, the injection of the air bubble in the uncured melt results in the deposition of a thin polymer annulus in the mold, then the concomitant gravity-driven drainage and curing of the elastomer sculpts the final shape. One can first consider the shape of the cross-section prior to drainage, right after the bubble injection. The flow at the front of the advancing bubble (see FIG. 9) leaves an annulus of constant thickness $h_i$. FIG. 10 shows this thickness in dimensionless form $h_i/R$ as a function of the dimensionless bubble speed or capillary number $Ca=\mu U/\gamma$, with R the radius, μ the melt viscosity, U the bubble velocity and γ the melt surface tension. The data for different polymers and tube radii fall on a master curve showing that the thickness first increases with the velocity until it eventually saturates for $Ca \gtrsim 3$.

This master curve can be understood from balancing viscous and capillary forces in the advancing meniscus yielding:

$$\frac{h_i}{R} = \frac{1.34 Ca^{2/3}}{1 + 1.34 \beta Ca^{2/3}} \quad (1)$$

One can plot equation (1) with β=2.65 along the data in FIG. 10 and find a good agreement. The melt annulus thickness, and hence the void fraction of the actuator, can thus be tuned by controlling the bubble velocity. In particular, using $Ca \gtrsim 3$ robustly results in $h_i \approx 0.3R$.

Figure 9:
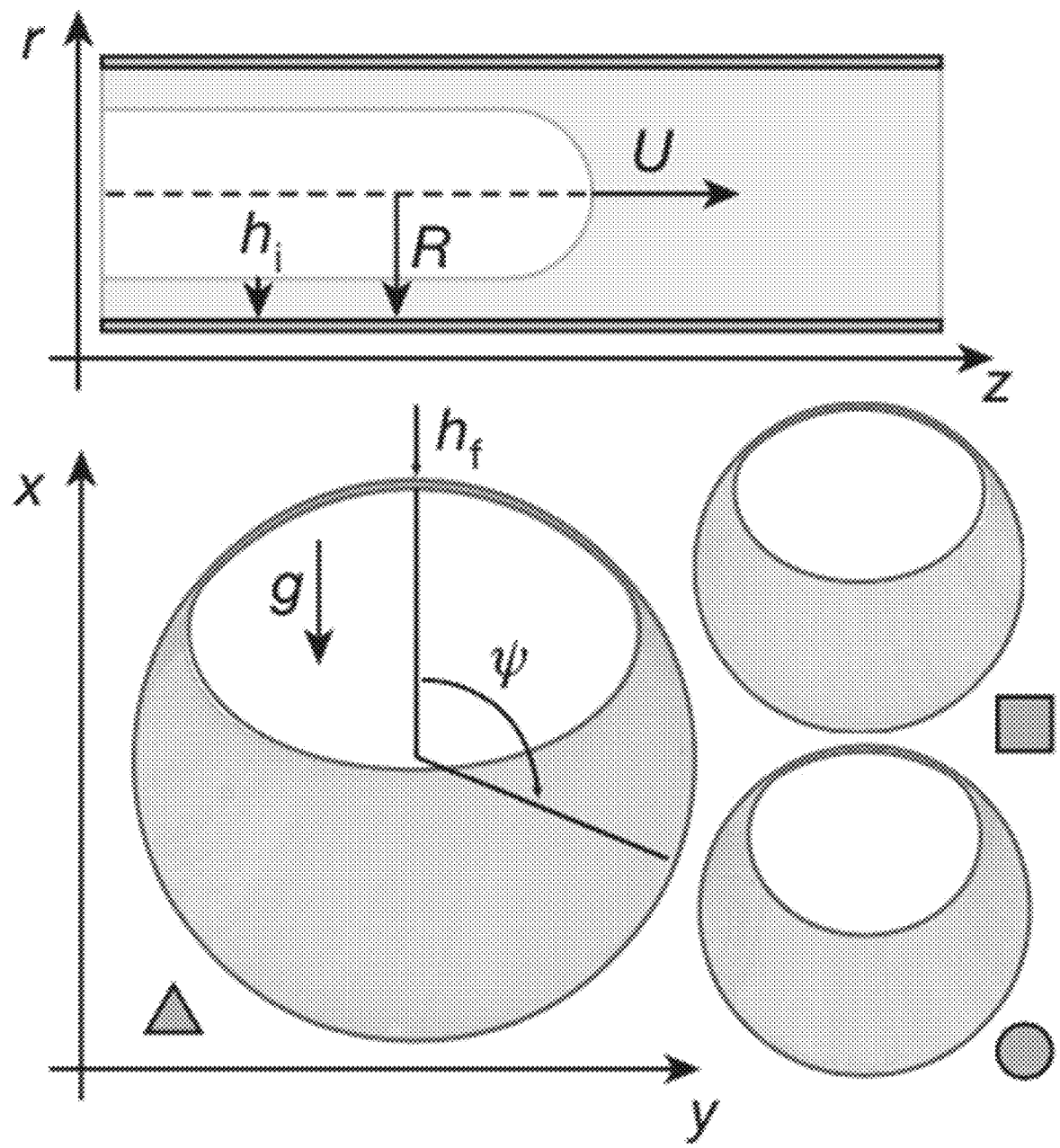
FIG. 9 is a schematic of the Bretherton problem and photographs of the subsequent final cross-section post drainage. VPS-32 actuators with waiting time $\tau_w=300$ s and radius R=$\{3.2, 2.4, 1.6\}$ mm, the red lines show a prediction.
Figure 10:
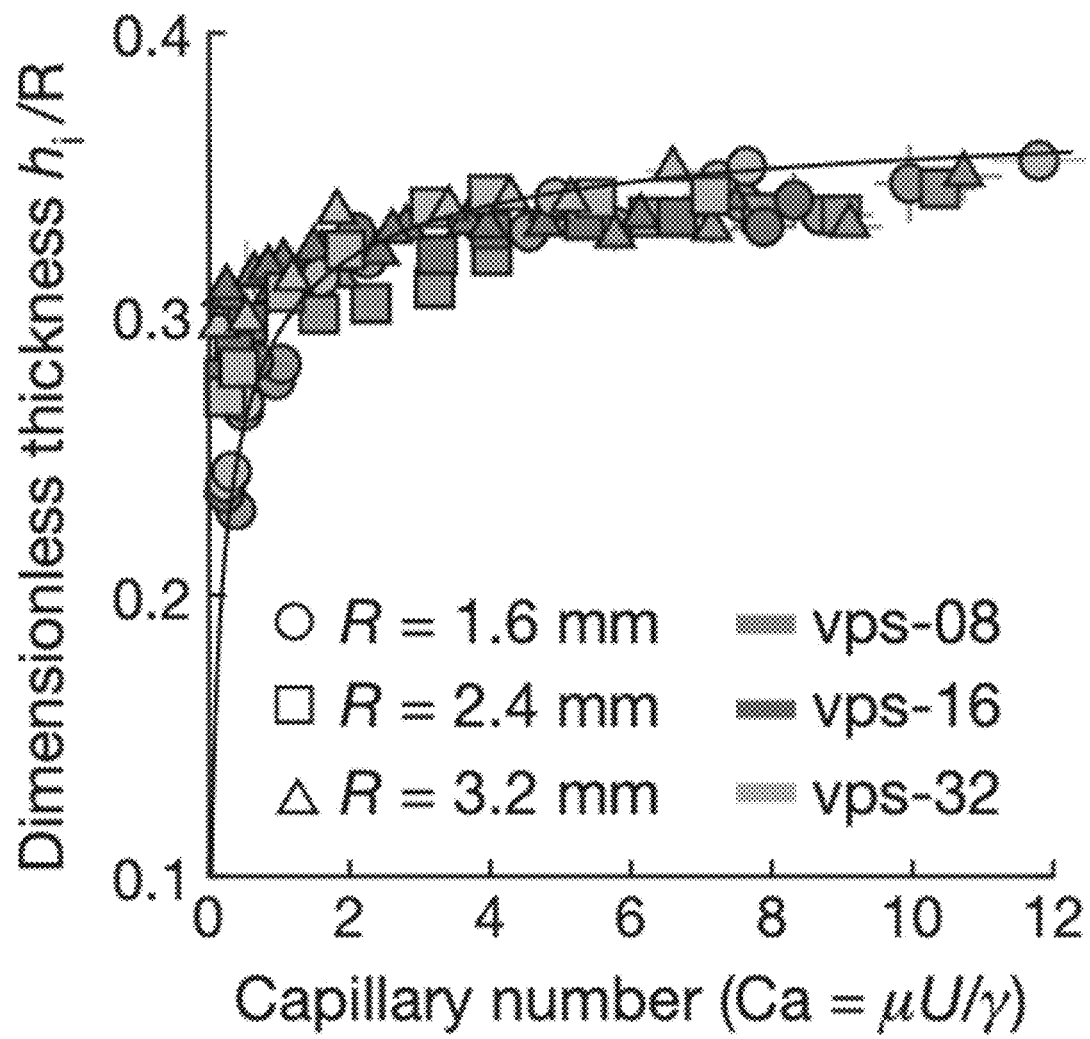
FIG. 10 is a graph showing dimensionless Bretherton film thickness $h_f/R$ plotted against the capillary number $Ca=\mu U/\gamma$. Error bars of the data for $h_f/R$ represent the standard deviation of three measurements at different positions along the actuator. Error bars of the data for CA represent propagated experimental uncertainty. The solid line is theory (equation (1)) with $\beta=2.65$.

The drainage of the annular polymer film left after bubble injection eventually sculpts the cross-section of the example actuators is shown in FIG. 9. As evident from FIG. 11, which shows the thickness along the central angle ψ defined in FIG. 9, the final shape consists of an upper thin film ($\psi \lesssim \pi/4$) of quasi-uniform thickness connected to a thicker region at the bottom.

One can first consider the upper thin film drainage driven by gravity g and resisted by viscosity. To predict the final thickness, one must account for the time-varying viscosity of our melt μ(t) as it solidifies. The rheological measurements are well described by the function $\mu(t)=\mu_0(1-t/\tau_c)^{-n}$, which diverges at $t=\tau_c$ the curing time. The values of the initial viscosity $\mu_0$, the curing time $\tau_c$ and the exponent $n \approx 2$ are fitted from the data, while the density of the melt ρ is assumed constant. Accounting that the drainage starts at a time $t=\tau_w$ after the reagents are mixed and finish at $t=\tau_c$, one can include the viscosity variations in the drainage model and predict the final thickness to be:

$$h(\tau_c) = \sqrt{\frac{3\mu_0 R(n+1)\tau_c^{n+1}}{2\rho g \tau_c (\tau_c - \tau_w)^{n+1}}} \quad (2)$$

Note that the final film thickness does not depend on the initial film thickness.

One can then consider the lower thick part of the cross-sections in FIG. 9. The shape of this bath results from the competition between gravity and capillarity, yielding the Young-Laplace equation that one solves numerically under the proper constraints.

Figure 17:
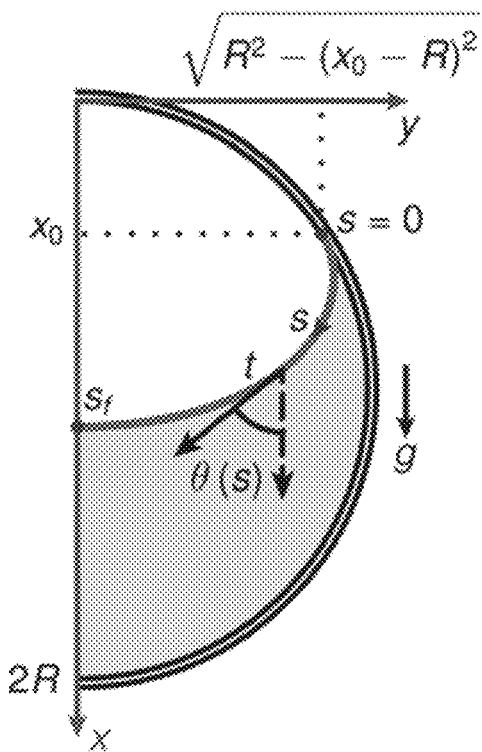
FIG. 17 is a schematic for the computation of the shape of a liquid bath.
Figure 18:
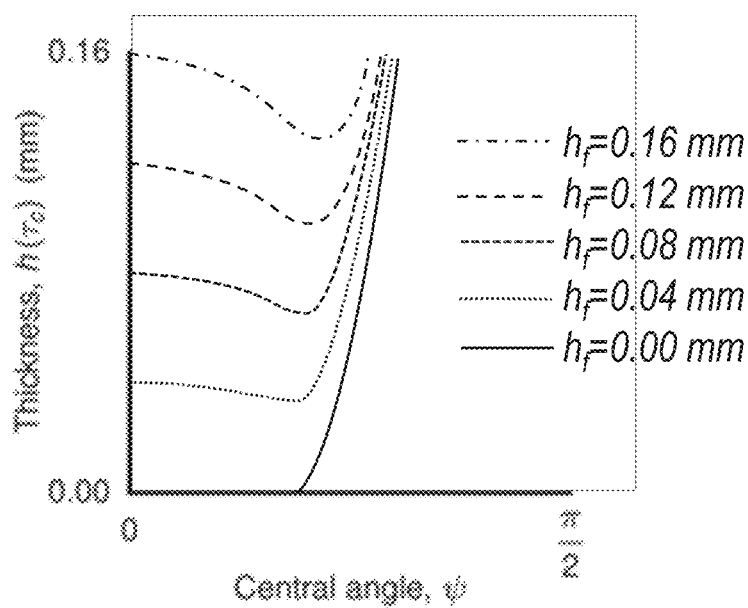
FIG. 18 is a graph showing model shape profiles obtained from matching of the bath solution (equation (9)) to the film thickness solution (equation (2)) for R=1.6 mm. The solid lines represent the membrane and the dashed lines represent the bath. The color codes the average membrane thickness $h_f$.
Figure 19A:
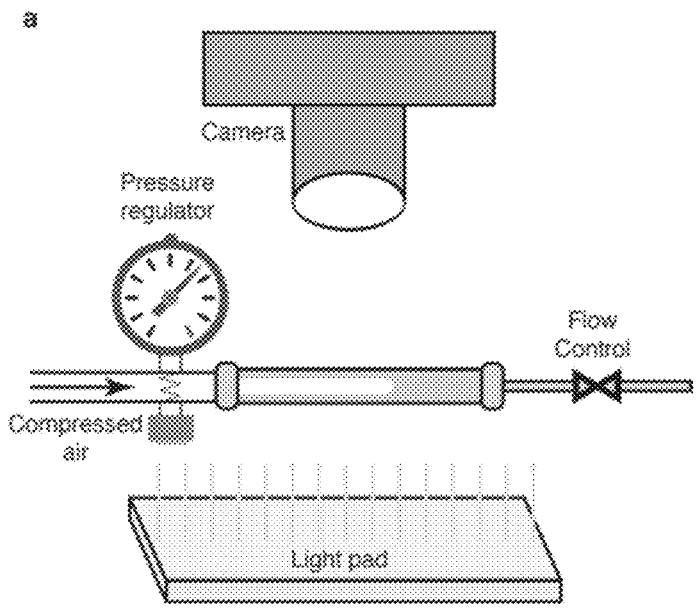
FIG. 19A is an illustration of a set-up for Bretherton-like flow experimentation during fabrication. The camera captures the bubble front velocity U to determine the Capillary number Ca.
Figure 19B:
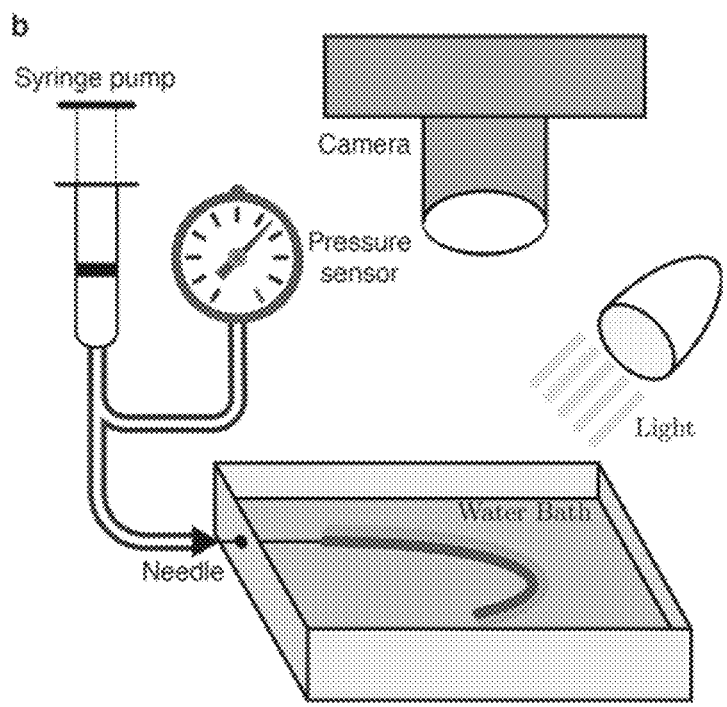
FIG. 19B is an illustration of a setup for inflation-bending experiments. The pressure sensor records the internal-external pressure difference P while the camera records the shape of the actuator.
Figure 19C:
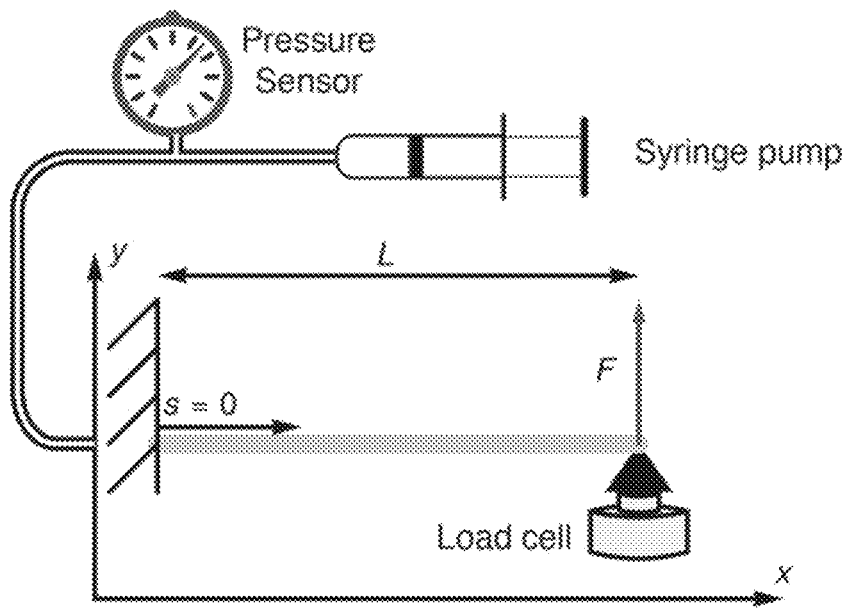
FIG. 19C is an illustration of a setup for blocking force-pressure experiments. The pressure sensor records the internal-external pressure difference P while the load cell measures the force F.
Figure 19D:
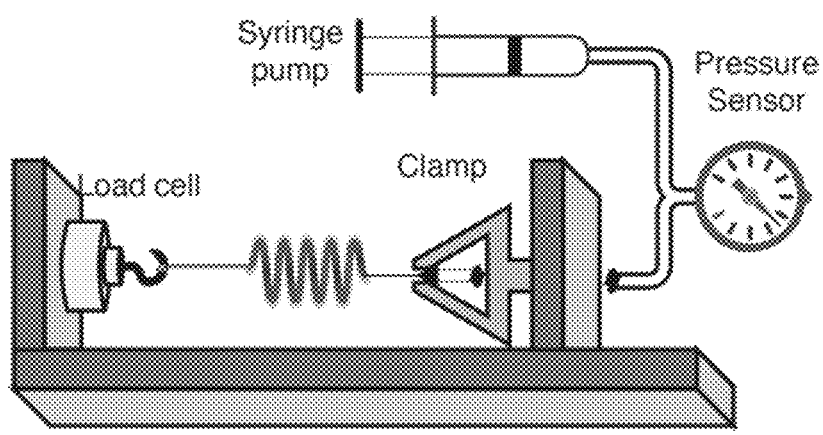
FIG. 19D is an illustration of a setup for force-elongation experiments. The pressure sensor records the internal-external pressure difference P while the Instron measures the force F and displacement 1.
Figure 20A:
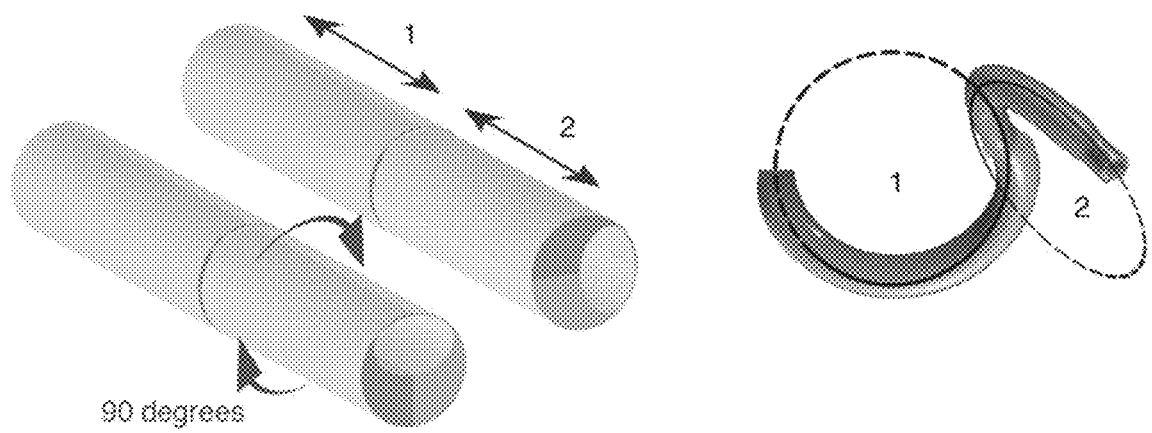
FIGS. 20A and 20B are illustrations showing two tubes kept tightly together with a connector that allows the rotation of one tube with respect to the other either 90 degrees (20A) or 180 degrees (20B). Applying the rotation at the very end of the drainage step, that is, around the gelation point where the polymer is still deformable, yet would not flow significantly anymore under the action of gravity results in the actuator shown to the right. Rotating the cylinder rotates the thin membrane and thus the direction of actuation under pressure. Here, the 90° (180°) rotation produces two curvatures equal in magnitude but in orthogonal planes (resp. with opposite signs).
Figure 20B:
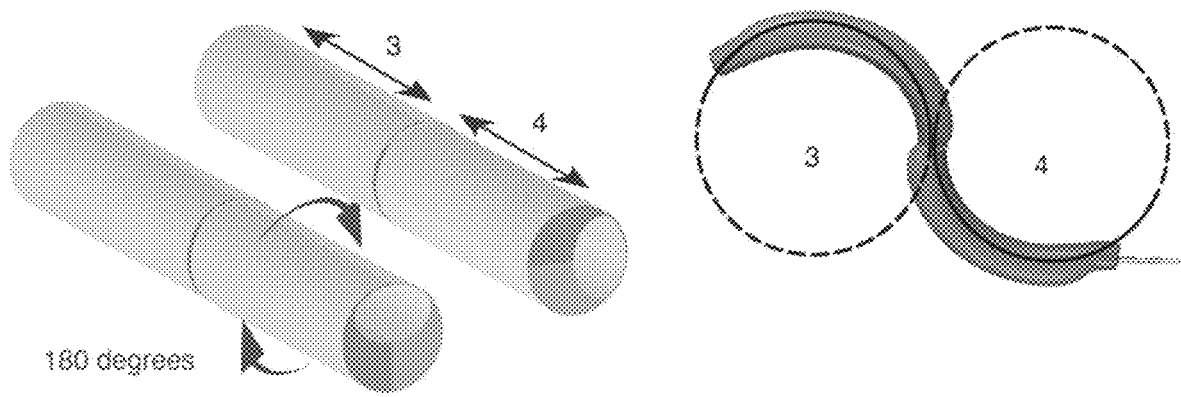

For example, the shape of the bath can therefore be computed with a quasi-static approach. It results from a competition between gravity and surface tension γ, which introduces the capillary length $l_c=\sqrt{\gamma/\rho g}$ as a typical length scale. For $R \gg l_c$, gravity dominates and the interface is flat while for $R \ll l_c$, capillarity dominates and the interface is circular. In some examples, we have $R \approx l_c = 1.4$ mm such that the interface shape is more complex and must be computed by balancing the hydrostatic and capillary pressures. Denoting the coordinates of the interface by {x(s), y(s)}, with s the arc length (see FIG. 17) and its curvature by κ(s) the pressure balance reads: $\rho g(x(s)-x(s_f))=\gamma\kappa(s)$. Differentiating this pressure balance with respect to s yields a second order differential equation for θ(s), the angle that the interface tangent $t(s)=\{\cos \theta(s), \sin \theta(s)\}$ makes with the vertical since $\kappa = d\theta/ds$. The bath shape is then fully defined by the following set of equations and boundary conditions:

$$\frac{d^2\theta}{ds^2} = -l_c^{-2} \cos \theta(s) = 0, \quad (2\text{-A})$$

$$\frac{dx}{ds} = \cos \theta(s), \frac{dy}{ds} = \sin \theta(s) = 0, \quad (2\text{-B})$$

$$x(0) = x_0, y(0) = \sqrt{R^2 - (x_0 - R)^2}, y(s_f) = 0, \quad (2\text{-C})$$

$$\theta(0) = \arcsin\left(1 - \frac{x_0}{R}\right), \theta(s_f) = -\frac{\pi}{2}. \quad (2\text{-D})$$

These boundary conditions ensure that the bath interface is tangent to the circular mold at s=0 and symmetric around y=0. The value of $s_f$ is a priori unknown and determined with the additional boundary condition. Using a shooting method, one can compute all the possible bath shapes for a given mold radius R by varying $x_0$. The bath shape corresponding to the example herein is selected by mass conservation; the bath volume must match the initial volume of liquid left by the Bretherton bubble (given by equation (1)).

Finally, one can match the upper film and lower bath to obtain the final thickness profile along the whole cross-section. The model cross-section is obtained by matching the meniscus, which is the solution of equations (2-A to 2-D), to the quasi-constant apex thickness given by equation (2). The matching is done by extending the meniscus upward with a circular arc and shifting the resulting curve downward by $h(\tau_c)$. As shown in FIGS. 9-12, and FIG. 18, the model cross-section $h(\psi)$ compares favorably with the experiment and captures the small dimple observed at the junction point.

Using this model shape, one can calculate the average thickness of the membrane $h_f$ used in the mechanical model as $$h_f = \frac{1}{\psi_0} h(\psi) d\psi = h(\tau_c).$$

Expanding up to the second order in $\psi_0$, this reduces to $$h_f \approx \frac{2}{3}h(0) + \frac{1}{3}h(\psi).$$

These values correspond to the maximum and minimum thicknesses of the membrane and are measured on experimental cross-sections.

Figure 11:
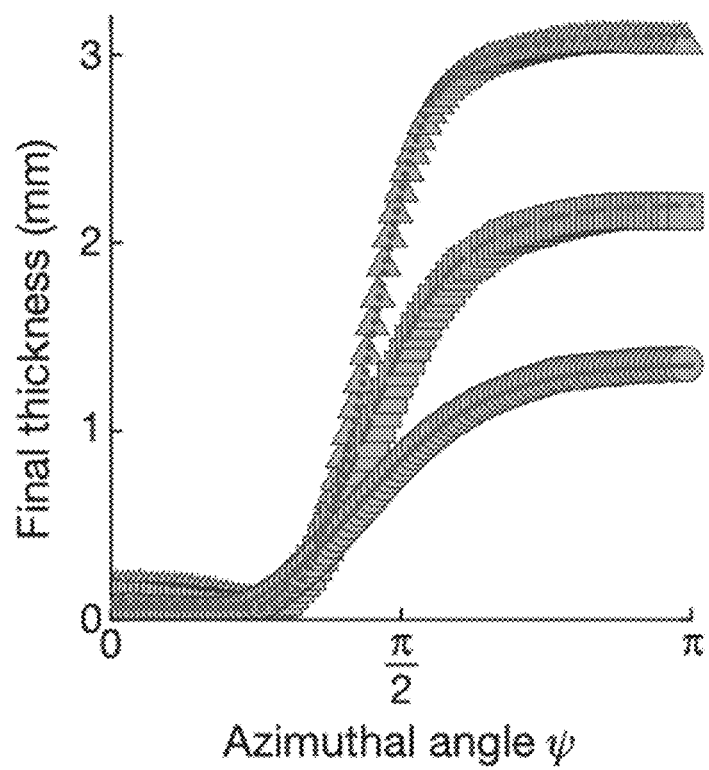
FIG. 11 is a graph showing film thickness of the samples in a plotted against the central angle ψ. The red lines are theoretical predictions (identical to predictions in FIG. 9).
Figure 12:
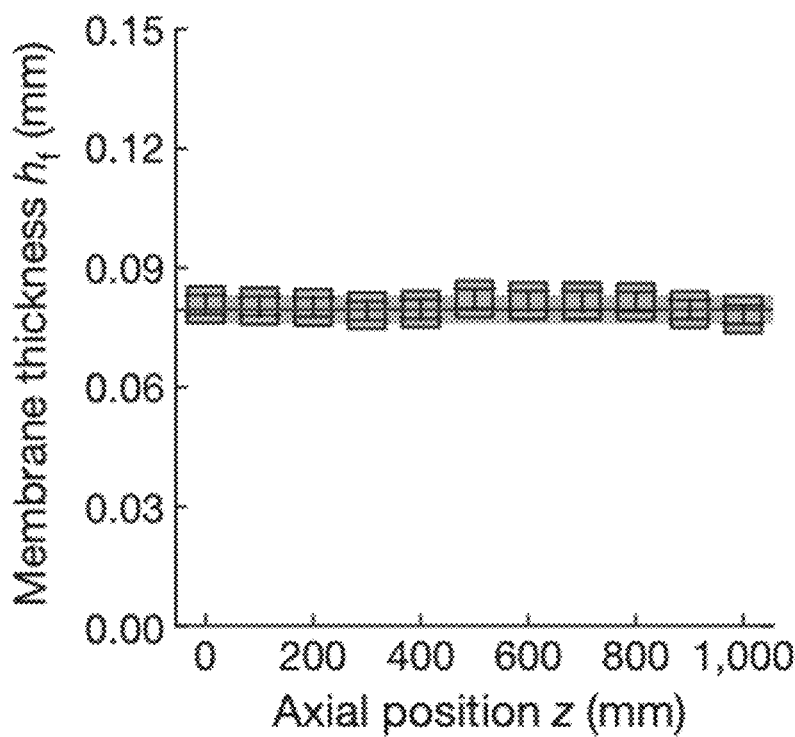
FIG. 12 is a graph showing average thickness of the membrane $h_f$ over a meter-long sample (R=2.4 mm). The black line shows the prediction while the green band accounts for parameters uncertainty in equation (2).

The model produces the curves overlaid on images of the cross-section in FIG. 9, and the theoretical thickness profile plotted along typical experimental data on FIG. 11. The agreement is favorable, demonstrating that it accurately modelled the flow physics of the method.

Note that bubble casting does not require external control so that fluid mechanics alone dictates the actuator shape, thereby making this methodology extremely robust. While the membrane thickness is on the order 100 µm, one can obtain meter-long samples that are virtually uniform (see FIG. 12.). Importantly, one can continuously and predictably tune the membrane average thickness $h_f$ through the waiting time $\tau_w$ since $$h_f \sim (\tau_c(\tau_c - \tau_w))^{\frac{n+1}{2}}$$

(see equation 2). In turn, the membrane thickness will play a key role in the component response to inflation as detailed next.

Figure 13:
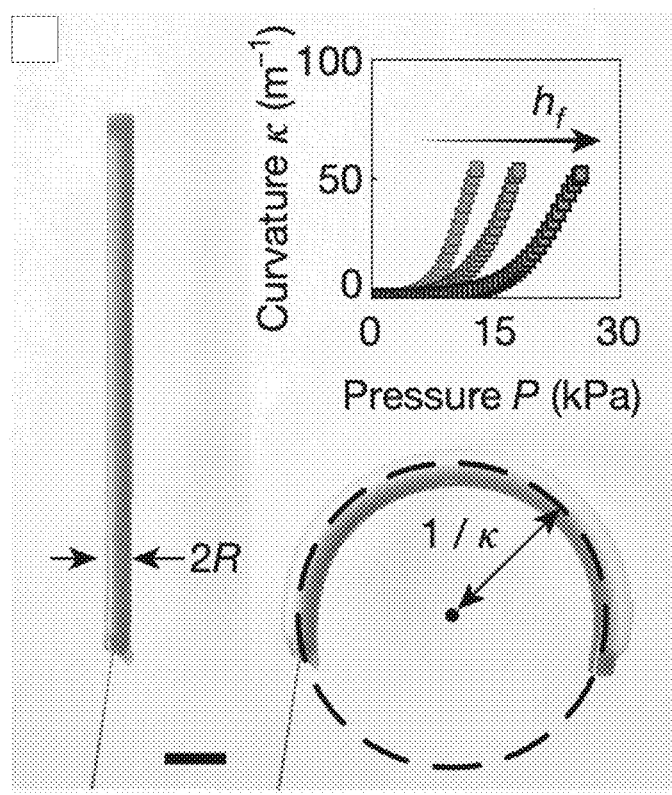
FIG. 13 is a series of images a VPS-16 actuator at rest and inflated at constant pressure: the actuator bends with a uniform curvature κ (scale bar, 1 cm). Inset: actuator curvature κ as a function of applied pressure P as the thickness is independently varied: $h_f$={130, 165, 273} μm.

Upon inflation, the upper membrane of our bubble-casted components stretch significantly more than its lower part, thereby creating a torque that bends the actuator (see FIG. 13). In absence of other forces, the actuator bends on its whole length and adopts a uniform curvature $\kappa$, as shown in FIG. 13. The pressure required to bend the actuator is independent of its length but increases with the elastic shear modulus G, and most importantly with the membrane thickness $h_f$. Predicting the deformation of an actuator is amenable to three-dimensional (3D) finite element simulations, which further confirm that the lower region of the actuator is virtually undeformed while the upper thin membrane is under quasi-isotropic stretch. This observation allows one to derive a simplified theoretical treatment of the problem (to determine a relationship between the actuation pressure and the resultant curvature one can minimize the free energy $\xi$ of the actuator), which combined with dimensional analysis suggests that the rescaled curvature $\kappa R^2/h_f$ only depends on the rescaled pressure $PR/Gh_f$. From the Buckingham $\pi$ theorem, it is expected that the inflation is governed by three dimensionless groups such that f ($\bar{\kappa}$, p, $\delta$)=0, with $\bar{\kappa}=\kappa R$, p=P/G and $\delta$=hf/R. This was confirmed by the experiments, and the master curve eventually obtained is well described by the power law: $\bar{\kappa}/\delta \sim (p/\delta)^\alpha$, which was power fitted to $\alpha$=3.72±0.0665 (standard error).

It can be shown that following this rescaling provides a reasonable collapse of the data. The resulting master curve exhibits a power law in the useful range of curvature ($\kappa R > 10^{-2}$) that can be fit and recast to obtain the relationship:

$$kR \sim \left[\frac{P}{G}\left(\frac{R}{h_f}\right)^{\frac{\alpha-1}{\alpha}}\right]^\alpha \quad (3)$$

with $\alpha$=3.72±0.07.

Figure 14:
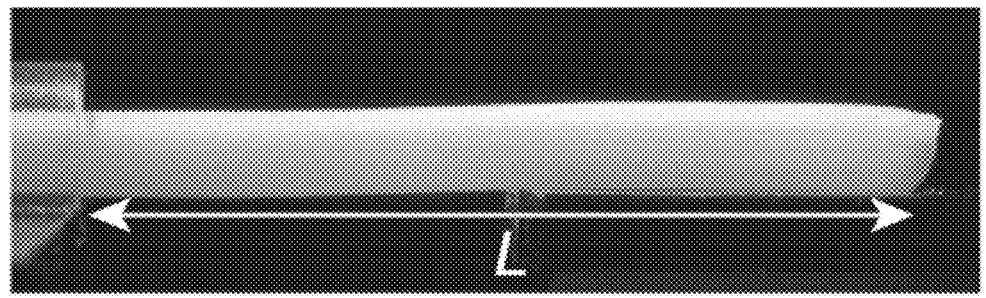
FIGS. 14 and 15 are images of a VPS-08 actuator at rest (14) and inflated (15) in a blocking force configuration (scale bar, 1 cm). The force F is measured for several actuators and reported in FIG. 16.
Figure 15:
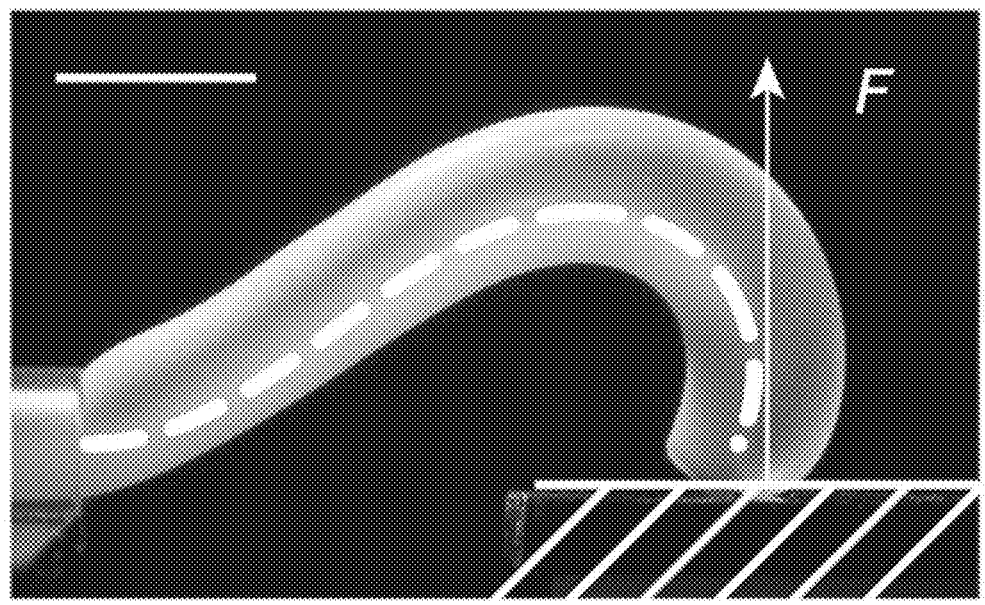

Furthermore, one can model the components (here, actuators) as elastic rods with effective natural curvature $\kappa$ varying according to equation (3) when pressure is applied. This centerline-based model can be solved to predict the deformation of the actuators in the presence of external loads, for example, when blocked from bending by a wall (FIGS. 14-15).

Bubble casting readily allows fabrication of long and thin actuators with R<<L that are rod-like in geometry. Here the mechanics of the rod-like actuators are modelled as naturally curved rods with an intrinsic curvature $\kappa$ that varies upon inflation.

The Kirchhoff rod equations are geometrically set in a local ortho-normal director basis {$d_1$, $d_2$, $d_3$}. Short-hand notation is introduced for partial derivative along the rod centerline arc length s,$(\cdot)'=\partial(\cdot)/\partial s$. The local director basis is a right-hand triad that follows the space curve of the rod r(s) such that the rod unit tangent lies along the director $d_3=r'/\|r'\|$. In the director basis the curvature of the rod $\kappa=\kappa_1 d_1+\kappa_2 d_2+\kappa_3 d_3$ is given by $d'_i=\kappa \times d_i$ with × denoting the cross product. Balancing the forces and torques along the rod arc length yields the Kirchhoff rod equations:

$$n'+f=0, \quad (18)$$

$$m'+d_3 \times n=0 \quad (19)$$

which are closed by the constitutive equation for the bending moments $$m=2G(1+v)I_1(\kappa_1-\kappa_1^*)d_1+2G(1+v)I_2(\kappa_2-\kappa_2^*)d_2+GJ(\kappa_3-\kappa_3^*)d_3 \quad (20)$$

In equations (18), (19) and (20) n are the internal forces, m are the bending moments, f is the external body force (per unit length), G is the shear modulus, v is the Poisson ratio, $I_i$ are the second moments of area, J is the torsion constant, and $\kappa^*=\kappa_1^* d_1+\kappa_2^* d_2+\kappa_3^* d_3$ is the natural curvature of the rod. Equations (18), (19) and (20) are made non-dimensional by scaling the lengths by the rod length L and introducing the dimensionless quantity $fL^3/B$ that compares the total force to the rod bending stiffness $B=2G(1+v)I_1$.

For the simplest case of straight actuators, the pneumatic actuation bends the actuator in only one direction. One can therefore chose that direction as the $d_1$ director plane in the local orthonormal director basis $\{d_1, d_2, d_3\}$ where $d_3$ is the rod tangent. One can model the bending as an instantaneous change to the natural curvature of the rod $$\kappa^* = \kappa(P) d_1 \tag{21}$$

With $\kappa(P)$ given by the simplified actuation model, that is, equation (3). Knowing the material constants G and v, and calculating numerically the second moments of area $I_1$, $I_2$, and torsion constant J using the theoretical cross-section of the actuator, the necessary ingredients are provided to model the components as Kirchhoff rods.

Figure 21C:
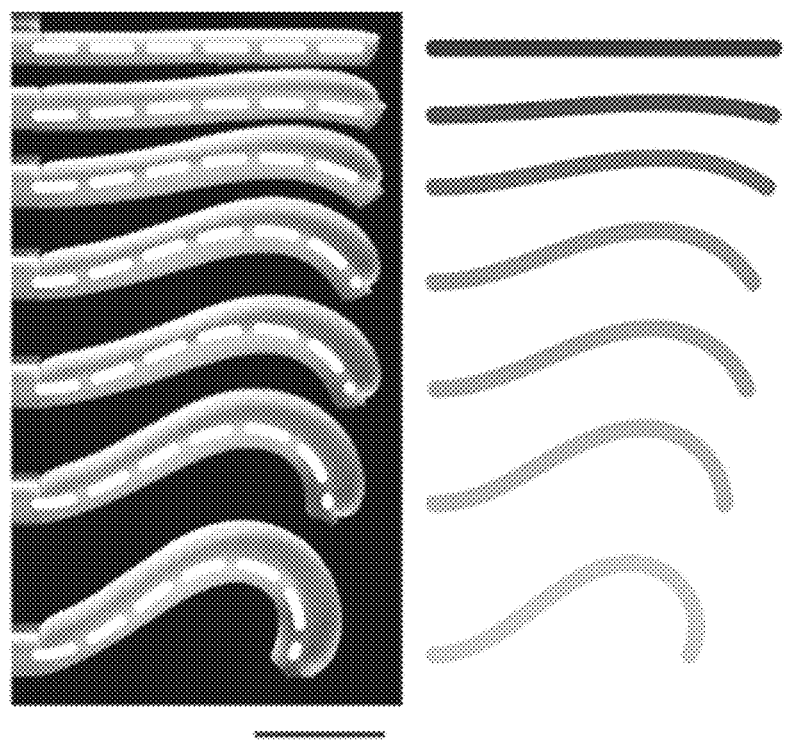
FIG. 21C is a graph showing Blocking force F as a function of the inflation pressure P for various actuators (R, G, hf and L have been varied).
Figure 21C:
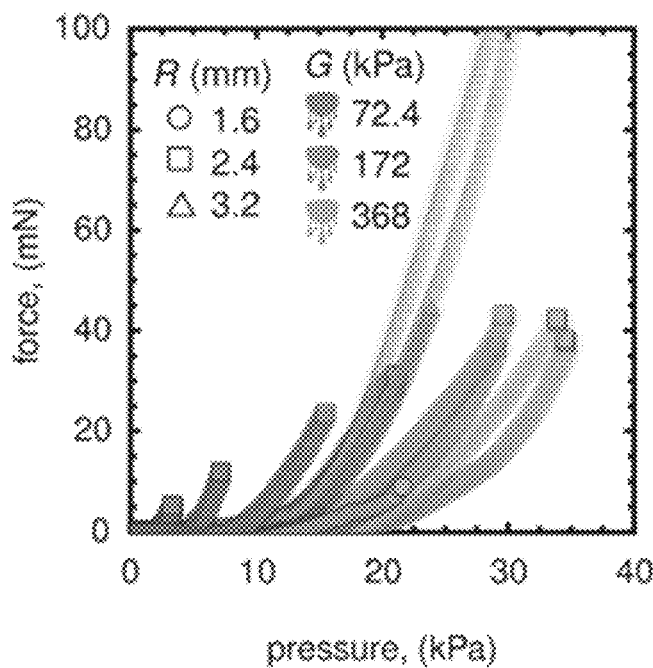

One can verify this model with initially straight actuators of varying length L, membrane thickness $h_f$, radius R, and shear modulus G with a blocking force F on the free end (see FIG. 18C). FIGS. 21A and 21B show that the actuator shape during inflation match the shape of a planar elastic rod with natural curvature $\kappa(P)$. As the actuator is inflated, one can measure the pressure P and the blocking force F for the components and plot the results. See FIG. 21C. The planar configuration simplifies the Kirchhoff equations where the tangent and moment simplify $d_3 = \{\cos \theta(s), \sin \theta(s)\}$ and $m = B(\kappa - \kappa^*)$ where $\theta(s)$ is the angle the tangent makes with the x axis, $\kappa = d\theta/ds$, and the bending stiffness $B = 2(1+v)GI_1$. Ignoring the effects of gravity, the force balance simplifies $n'(s) = 0$ as forces are only applied at the ends of the actuator. Further neglecting friction, one gets $n(s) = n(L) = Fe_y$. The actuator with a blocking force on the free end is described by the following set of equations and boundary conditions:

$$B \frac{d^2\theta}{ds^2} + F \cos \theta(s) = 0 \tag{22-A}$$

$$\frac{dx}{ds} = \cos \theta(s), \frac{dy}{ds} = \sin \theta(s), \tag{22-B}$$

$$, x(0) = 0, y(0) = 0, y(L) = 0, \tag{22-C}$$

$$\theta(0) =, \frac{d\theta}{ds}(L) = \kappa(P). \tag{22-D}$$

These boundary conditions account for the clamped rod at $s=0$ and the blocking force and free moment at the blocked end $s=L$. The blocking force F is unknown a priori and determined with the additional boundary condition using a shooting method. For small deflection, $\theta \ll 1$, the curvature is approximated as $\kappa \approx d^2 y/dx^2$ and equation (22) reduces to:

$$B \frac{d^3 y}{dx^3} + F = 0 \tag{23-A}$$

$$y(0) = 0, y(L) = 0, \tag{23-B}$$

$$\frac{dy}{dx}(0) = 0, \frac{d^2 y}{dx^2}(L) = \kappa(P). \tag{23-C}$$

Figure 16:
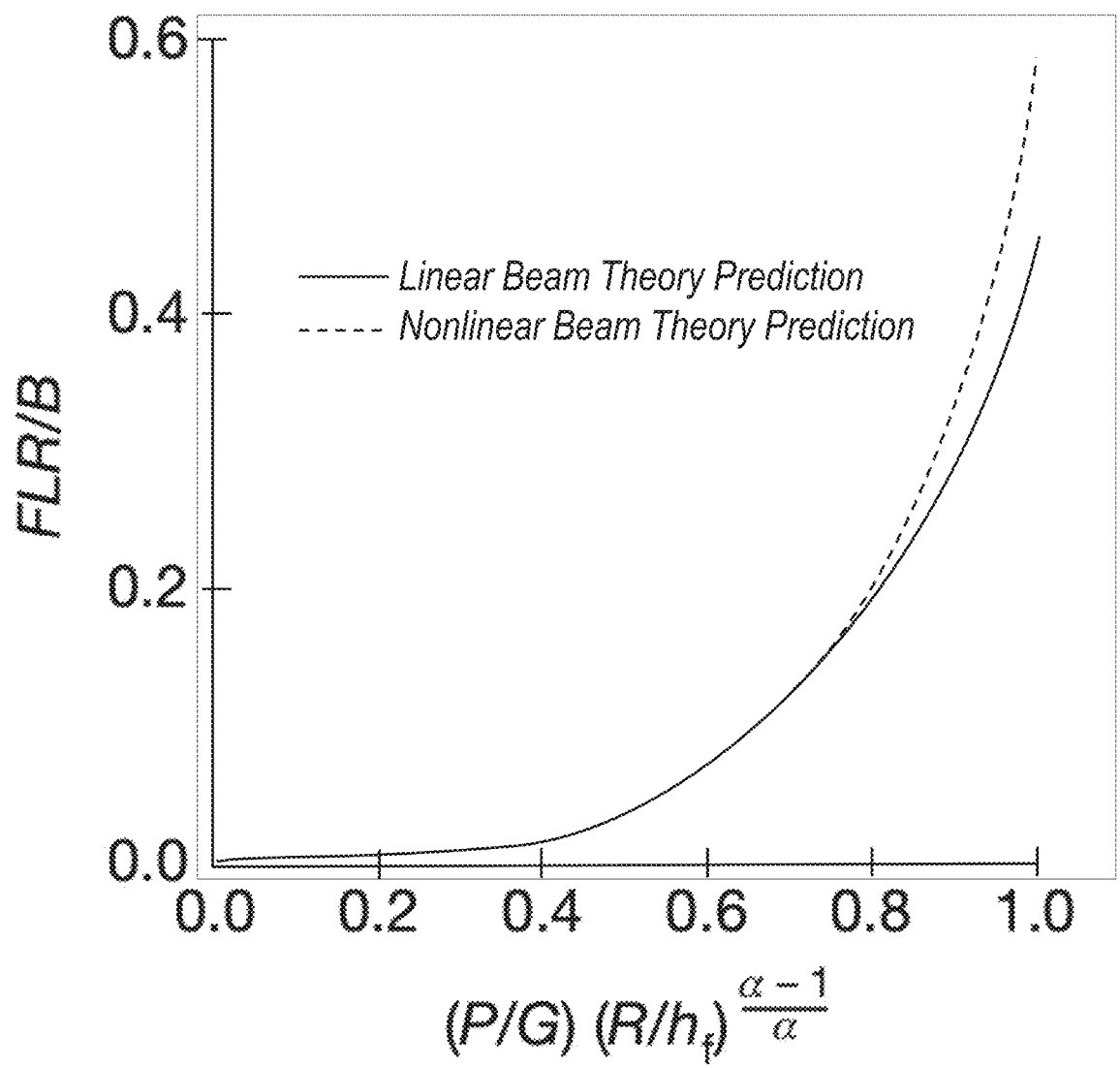
FIG. 16 is a graph showing linear and nonlinear beam theory predictions.

Equation (23) is readily solved to show that the blocking force is given by $FL = 3/2 B\kappa(P)$. The full solution of equations (22) and the linear solution of equations (23) are plotted along the rescaled experimental data in FIG. 16 using equation (3) to relate the natural curvature and pressure. The data collapse is favorable and well described by the linear (equation (23)) and nonlinear (equation (22)) models.

One can further test the Kirchhoff rod approach with initially straight actuators of varying membrane thickness $h_f$ freely hanging. Upon inflation, the actuator first begins to bend near the free hanging end and then coils into 3D shapes (see FIG. 22A) in a way akin to the transition from straight to wavy to curly hair. Here the external body force is the self-weight of the actuator such that the force balance reads $$n' + \rho A g = 0 \tag{24}$$

with A the component cross-sectional area and g the gravitational acceleration vector. One can solve the non-dimensional Kirchhoff rod equations with a natural curvature increasing with the pressure (equation (21)) using AUTO-07p continuation (dimensionless parameters extracted from the experiment: $\rho A g L^3 / 2G(1+v)$ $I_1 = 1571$, $I_2/I_1 = 1.7$ and $J/3I_1 = 0.9$). The comparison between experiments and the Kirchhoff rod model with variable curvature is quantitative as shown in FIGS. 22B and 22C.

Figure 23:
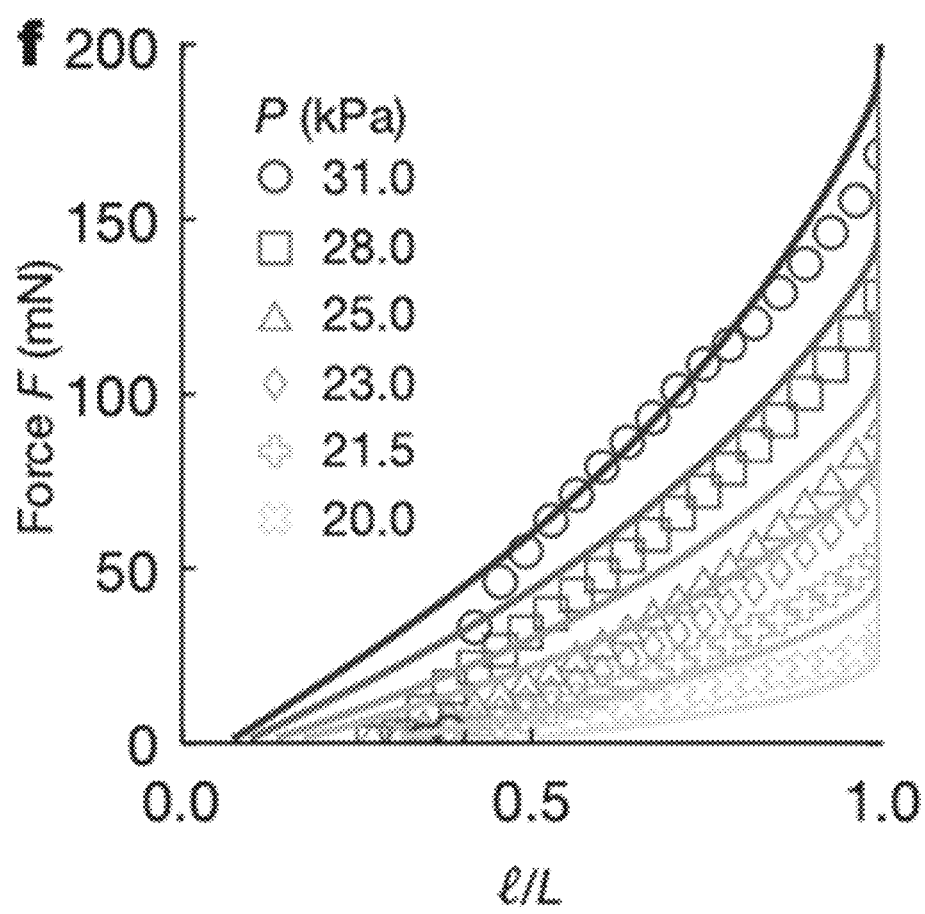
FIG. 23 is a graph showing force-elongation curves of a typical actuator at different pressure. The solid curves are the result of the equivalent Kirchhoff rod simulations.

The model can then be applied to soft robotic muscles. In some experiments, the end of the actuator is attached to a force sensor (see FIG. 18D). The actuator is pressurized to a constant pressure and the pulling force is measured as the actuator is contracted from its initial length L to the length where the force vanishes. The experiment is repeated for different pressures to fully characterize the muscle strength. To model this with the Kirchhoff rod model we add a point force boundary condition (the pulling force) to the end of the rod $n(s=L) = F$, which combine with gravity along the rod $(n(s=0) = \rho A g L + F)$. The equations can be solved with AUTO-07p and the contraction can be measured as one varies the pulling force and the pressure in equation (21). As shown in FIG. 23, the Kirchhoff rod model quantitatively reproduces experiments.

It is found that the overall shape of the component and the blocking force F exerted in this setup are well captured by the reduced order model when varying independently the actuator bending stiffness B, shear modulus G, length L, radius R and thickness $h_f$ (see FIG. 16), thereby validating the approximations introduced in the model. Importantly, this model allows one to program the mechanical response of the components via the shape of their cross-section as detailed next. In this framework, solving the inverse design problem, that is, finding the actuator that will morph to a target curvature, merely requires to invert the scaling law in equation (3).

Figure 24:
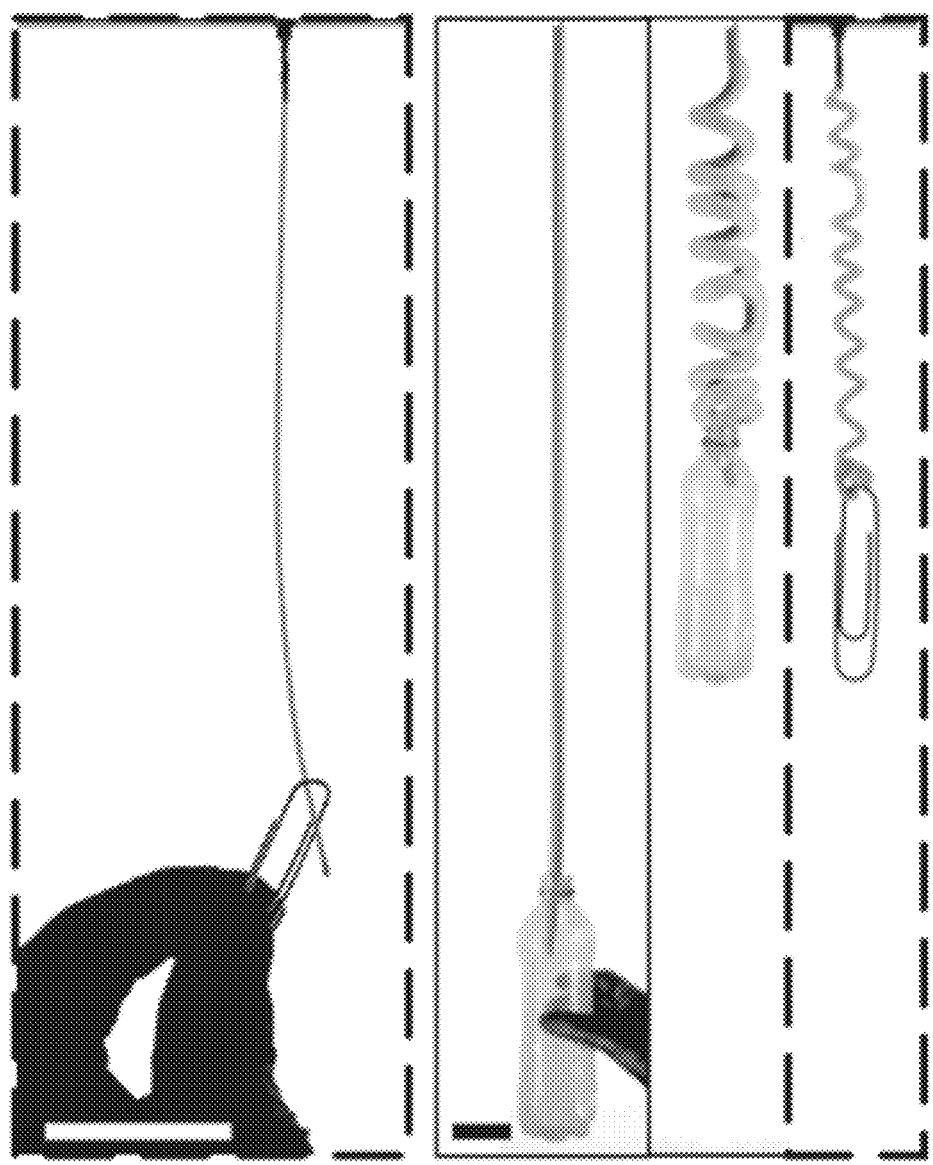
FIG. 24 is an illustration of wwo VPS-16 robotic muscles of R=6.4 and 0.5 mm lifting an empty bottle and a paperclip (scale bars, 4 cm).

It can now be demonstrated how to leverage this knowledge to design soft robotic muscles inspired by cucumber tendrils. These muscles can be used over a wide range of size and strength (see FIGS. 22A, 24) and can be integrated to programmable soft machines (FIG. 25).

Figure 22A:
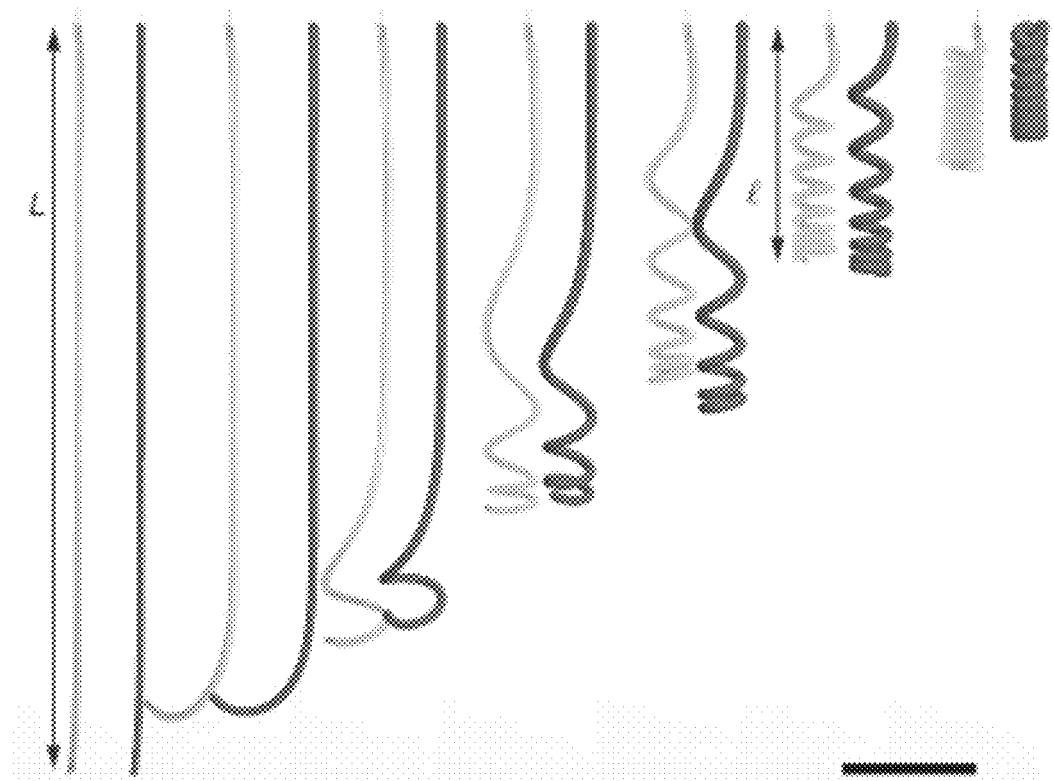
FIG. 22A is a series of illustrations showing contractile coiling of an actuator formed in a rectilinear mold. Experiments and model are shown side-by-side.
Figure 22B:
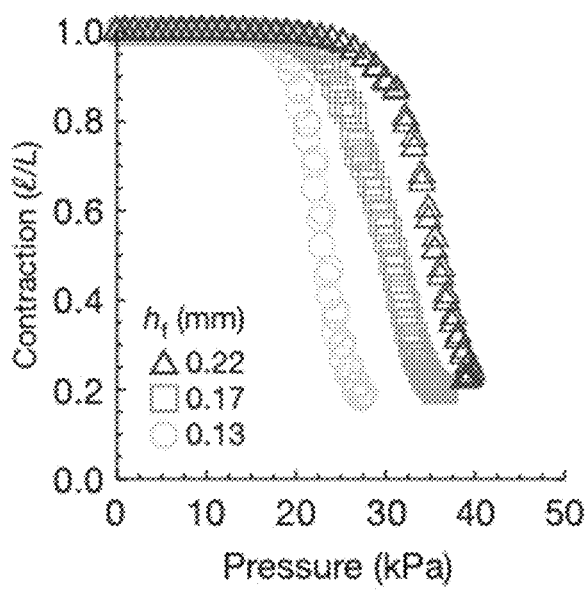
FIGS. 22B and 22C are graphs showing contraction l/L (see FIG. 22A) as a function of the applied pressure (22B) for actuators with different membrane thicknesses $h_f$={0.14, 0.17, 0.22} mm, and as a function of the dimensionless pressure (see equation (3)) (22C). The red curve is the result of Kirchhoff rod simulations. VPS-16, shear modulus G=172 kPa, outer radius R=1.6 mm and length L=320 mm.
Figure 22C:
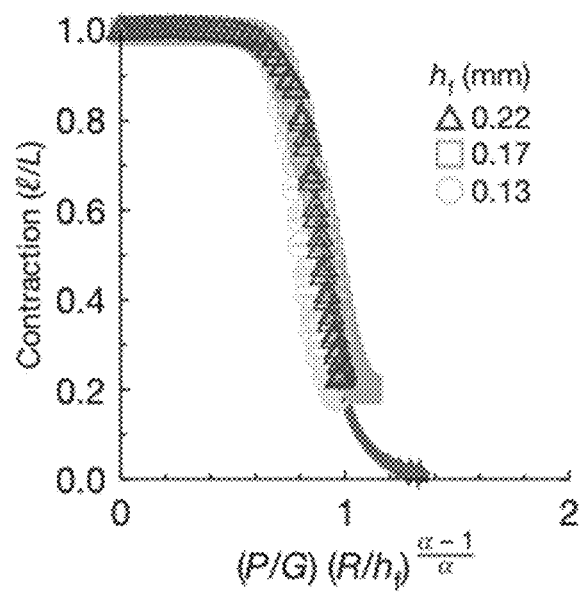

When subject to gravity, the curvature imparted by the actuation pressure competes with the actuator weight and generates a curling motion (see FIG. 22A). These shapes are analogous to the static configurations obtained with naturally curved elastic rods and are well captured by the disclosed centerline-based theory. In FIG. 22B, it is shown that the example robotic muscles can contract up to $1 - l/L \approx 80\%$ of their initial length before entering in self-contact, exceeding the stroke of typical pneumatic muscles. As evident from the figure, the transition between the extended and contracted configurations is sharp and occurs for values of pressure varying with $h_f$. In FIG. 22C, it is shown that the variation of the free-hang length with pressure collapses when using equation (3) combined to the disclosed rod model, further confirming the validity of the rod theory in the limit of very large deformations. As such, one can predict and tune the pulling force exerted by these muscles. For instance, in FIG. 23, it is shown that the effective stiffness of these muscles can be smoothly varied via the applied pressure.

Figure 25:
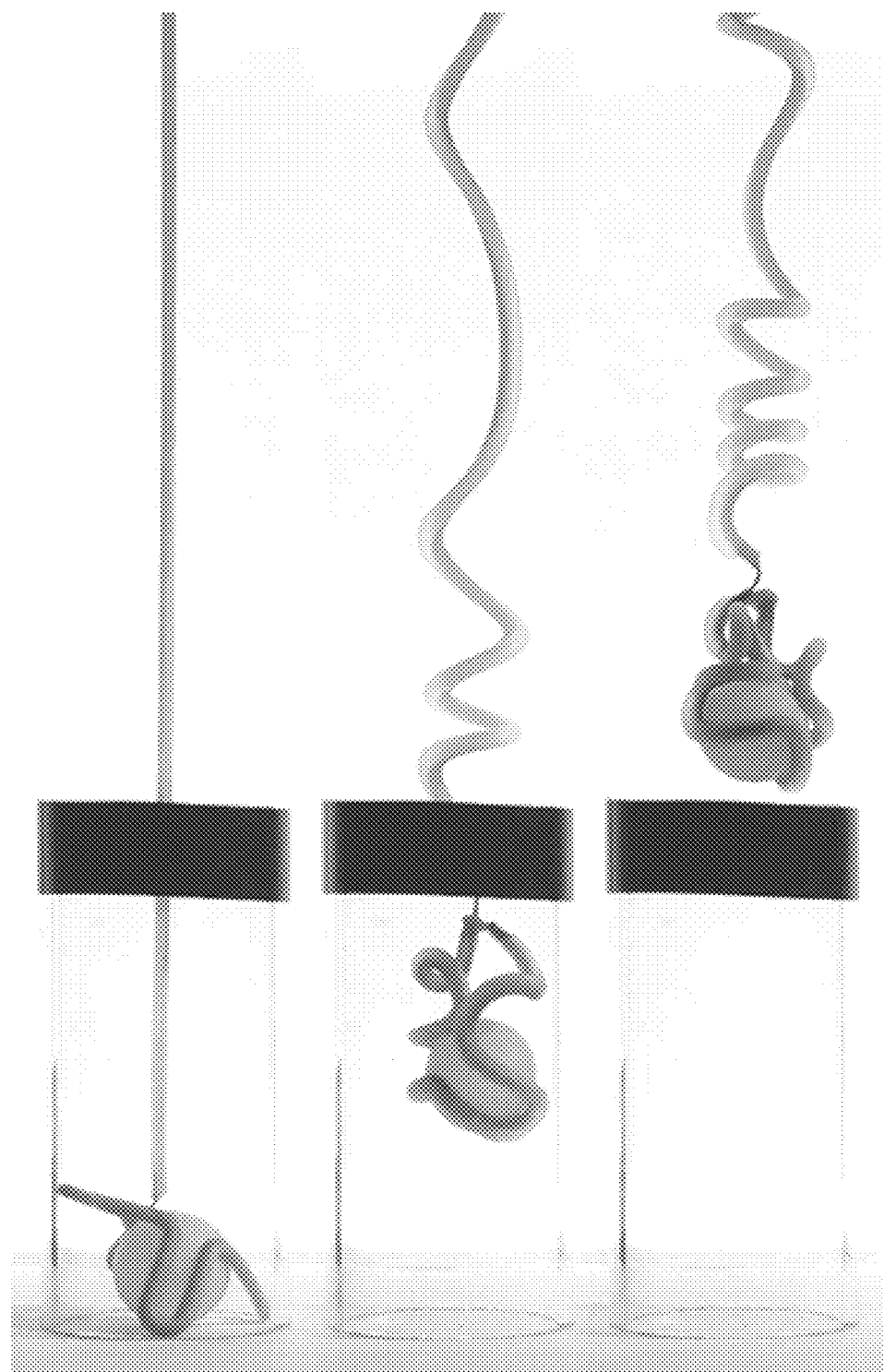
FIG. 25 is a series of images of a soft machine gripping and lifting a ball from a narrow cylinder.

This level of control allows one to program soft machines capable of achieving complex tasks, such as retrieving a ball sitting at the bottom of a narrow cylinder (see FIG. 25). This contraption comprises two interconnected building blocks reverse engineered using equation (3) to sequentially grip and then pull a ball following the monotonic increase of a single pressure source.

Programming can also be achieved using fluid mechanics alone, that is, modulating the membrane thickness $h_f$ via equation (2). For instance, using a programmed sequence of injection of the bubble where $\tau_w$ increases by step across a sample, one can readily cast an actuator with, e.g., four different values of $h_f$, each confined to a 'finger' of the actuator (see FIG. 4A). As a result, an increase of the pressure in this monolithic actuator leads to the sequential bending of each finger shown in FIGS. 4B-4D. Likewise, one can solve the inverse problem where a simple target shape can be obtained by carefully choosing $\tau_w$ across the actuator.

In closing, it is noted that bubble casting is a bonding-free fabrication method that relies on the fluid flow instead of an internal template to build a void. This reliance on continuum mechanics as opposed to machined parts allows for defect-free fabrication of soft pneumatic actuators over a wide range of sizes, and previously impossible aspect ratios. In particular, the thin membranes we achieve optimize the eccentric void topology and outperform most inflatable actuators in terms of bending coefficients (defined as the ratio between the curvature and the applied pressure at a bending deformation of 90°). Furthermore, the unconstrained internal surface makes the construction of curved and network actuators that achieve 3D folding shapes (FIGS. 5-7) as simple as building straight actuators.

The disclosed approach may be employed, inter alia, for soft robotic manipulators, e.g., contractile muscles, grippers, etc.; and for biomedical applications, such as endoscopy.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed:

1. A method for assembly and programming of soft robots, comprising:
    generating a flooded channel by injecting a liquid undergoing solidification into a channel or a channel network of a mold, wherein the channel network comprises a plurality of channels;
    injecting a bubble into the flooded channel prior to solidification to create a cavity; and
    forming a target component by allowing a portion of the liquid in an annulus deposited on the mold after bubble injection to drain downward and curing the liquid undergoing solidification, and rotating portions of the mold relative to each other around a gelation point of the liquid undergoing solidification.

2. The method according to claim 1, further comprising creating the mold.

3. The method according to claim 1, further comprising removing the target component from the mold.

4. The method according to claim 1, further comprising inflating the target component.

5. The method according to claim 1, wherein a pressure used to inflate the target component is 5 kPa-1000 kPa.

6. The method according to claim 1, wherein a pressure used to inflate the target component is greater than 30 kPa.

7. The method according to claim 1, wherein further comprising configuring the target component to generate a curling motion as pressure is applied.

8. The method according to claim 1, wherein the target component is an actuator.

9. The method according to claim 1, wherein the liquid undergoing solidification is a siloxane.

10. The method according to claim 9, wherein the siloxane is vinyl polysiloxane.

11. The method according to claim 1, further comprising tuning a void fraction of the target component by controlling a velocity of the bubble.

12. The method according to claim 1, wherein the method is a batch process.

13. The method according to claim 1, wherein the method is a continuous process.

14. The method according to claim 1, wherein curing comprises heating or UV curing the liquid.

* * * * *